(12) United States Patent
Ishii et al.

(10) Patent No.: US 8,267,205 B2
(45) Date of Patent: Sep. 18, 2012

(54) RIDING WORK VEHICLE

(75) Inventors: Norihiro Ishii, Hyogo (JP); Tomoyuki Ebihara, Hyogo (JP); Kengo Sasahara, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 231 days.

(21) Appl. No.: 12/704,878

(22) Filed: Feb. 12, 2010

(65) Prior Publication Data
US 2010/0206647 A1 Aug. 19, 2010

(30) Foreign Application Priority Data
Feb. 13, 2009 (JP) ................. 2009-030949

(51) Int. Cl.
*B62D 11/02* (2006.01)

(52) U.S. Cl. ...... 180/6.44; 180/6.2; 180/6.28; 180/6.38; 180/6.48; 180/252; 180/253; 180/255; 180/65.6

(58) Field of Classification Search .......... 180/6.44, 180/6.2, 6.28, 6.38, 6.48, 6.5, 252, 253, 255, 180/65.6
See application file for complete search history.

(56) References Cited

U.S. PATENT DOCUMENTS

| | | | |
|---|---|---|---|
| 5,916,285 A * | 6/1999 | Alofs et al. ................ 701/23 |
| 6,491,127 B1 * | 12/2002 | Holmberg et al. ............ 180/252 |
| 6,948,576 B2 * | 9/2005 | Angeles ..................... 180/23 |
| 7,418,328 B2 * | 8/2008 | Romig ....................... 701/41 |
| 7,565,937 B2 * | 7/2009 | Deguchi et al. ............. 180/6.28 |
| 7,591,340 B2 * | 9/2009 | Scharfenberg et al. ....... 180/252 |
| 7,634,327 B2 * | 12/2009 | Jung et al. .................. 700/245 |
| 2009/0000839 A1 * | 1/2009 | Ishii et al. ................... 180/65.5 |

FOREIGN PATENT DOCUMENTS

| JP | 2008-168869 A | 7/2008 |
| JP | 2008-168871 A | 7/2008 |

* cited by examiner

*Primary Examiner* — Lesley D Morris
*Assistant Examiner* — Marlon Arce
(74) *Attorney, Agent, or Firm* — Cantor Colburn LLP

(57) ABSTRACT

A riding work vehicle includes right and left wheels, at least one caster wheel, and a working machine. The lawnmower vehicle further includes traveling motor, steering motor, a traveling system clutch, and a steering system clutch. The traveling system clutch is configured to disable transmission of the rotational force from an axle of the caster wheel to the traveling motor in a state where the traveling motor is deactivated. The steering system clutch is configured to disable transmission of the rotational force from a steering shaft for the caster wheel to the steering motor in a state where the steering motor is deactivated.

8 Claims, 16 Drawing Sheets

$$R : V_M = T : \frac{V_o - V_i}{2}$$
$$V_M = \frac{V_o + V_i}{2}$$
$$\therefore R = T \times \frac{(V_o + V_i)/2}{(V_o - V_i)/2} = T \times \frac{V_o + V_i}{V_o - V_i}$$
$$V_o = 2\pi r_r \times \frac{N_o}{60}$$
$$V_i = 2\pi r_r \times \frac{N_i}{60}$$
$$\therefore R = T \times \frac{N_o + N_i}{N_o - N_i}$$

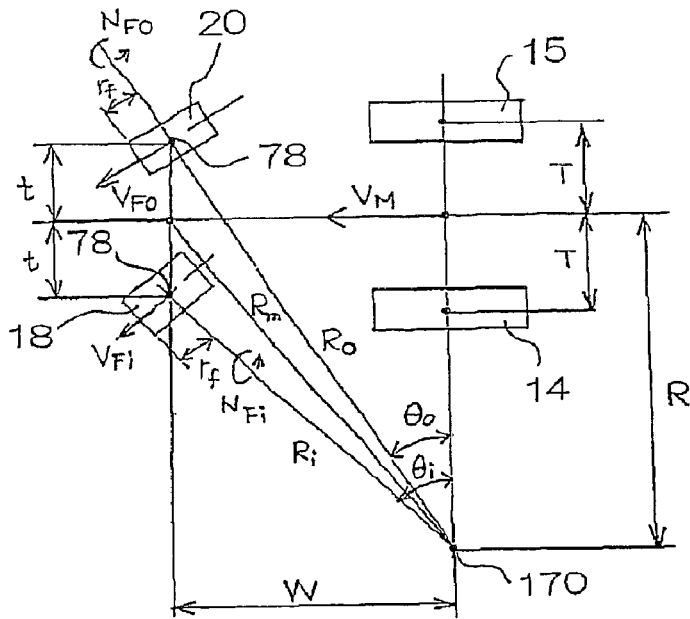

FIG. 15A $$R_o = \sqrt{(R+t)^2 + w^2} = \sqrt{\left(T \times \frac{N_o+N_i}{N_o-N_i} + t\right)^2 + w^2}$$

$$R_i = \sqrt{(R-t)^2 + w^2} = \sqrt{\left(T \times \frac{N_o+N_i}{N_o-N_i} - t\right)^2 + w^2}$$

$$\theta_o = \cos^{-1}\{(R+t)/R_o\}$$
$$= \cos^{-1}\left\{\left(T \times \frac{N_o+N_i}{N_o-N_i} + t\right) \Big/ \sqrt{\left(T \times \frac{N_o+N_i}{N_o-N_i} + t\right)^2 + w^2}\right\}$$

$$\theta_i = \cos^{-1}\{(R-t)/R_i\}$$
$$= \cos^{-1}\left\{\left(T \times \frac{N_o+N_i}{N_o-N_i} - t\right) \Big/ \sqrt{\left(T \times \frac{N_o+N_i}{N_o-N_i} - t\right)^2 + w^2}\right\}$$

FIG. 15B $$R : R_O = V_M : V_{FO}$$

$$\therefore V_{FO} = V_M \times (R_O/R)$$

$$V_{FO} = 2\pi r_f \times N_{FO}/60$$

$$V_M = 2\pi r_r \times N_M/60 = 2\pi r_r \times \left(\frac{N_o + N_i}{2}\right)/60$$

$$\therefore 2\pi r_f \times N_{FO}/60 = \left[2\pi r_r \times \left(\frac{N_o + N_i}{2}\right)/60\right] \times (R_O/R)$$

$$\therefore N_{FO} = \frac{N_o + N_i}{2} \times \frac{r_r \times R_O}{r_f \times R}$$

$$= \frac{N_o + N_i}{2} \times \frac{r_r \times R_O}{r_f \times T \times \frac{N_o + N_i}{N_o - N_i}}$$

$$= \frac{r_r \times \sqrt{\left(T \times \frac{N_o + N_i}{N_o - N_i} + t\right)^2 + W^2} \times (N_o - N_i)}{2 r_f \times T}$$

SIMILARLY, BASED ON $R : R_i = V_M : V_{Fi}$ $$N_{Fi} = \frac{r_r \times \sqrt{\left(T \times \frac{N_o + N_i}{N_o - N_i} - t\right)^2 + W^2} \times (N_o - N_i)}{2 r_f \times T}$$

FIG. 16

RIDING WORK VEHICLE

PRIORITY INFORMATION

The present invention claims priority from Japanese Patent Application No. 2009-30949 filed on Feb. 13, 2009, which is hereby incorporated herein in its entirety.

BACKGROUND

1. Technical Field

The present invention relates to a riding work vehicle, which includes right and left wheels that are operable as main driving wheels and respectively driven independently for traveling, at least one caster wheel that is operable as a steering wheel whose operational state is selectable between free traveling and forced traveling and also between free steering and forced steering, and a working machine that is operable for work on the ground.

2. Related Art

A work vehicle equipped with a working machine is available for work on the ground, such as a conventionally known lawn mower, farm tractor, or the like. The work vehicle can include right and left wheels that are operable as main driving wheels and respectively driven independently for traveling by a power source (e.g., an electric motor) and a caster wheel that is a freely steerable steering control wheel.

For example, a riding lawnmower vehicle is an automotive work vehicle that is equipped with a lawnmower as a working machine and enables a worker to ride thereon and perform operations for traveling and for ground work. The lawnmower mounted on the riding lawnmower vehicle is, for example, a lawnmower rotary tool.

The riding lawnmower vehicle is an off-road vehicle that usually travels on the ground surface of a garden or the like to operate for lawn mowing work, although the riding lawnmower vehicle is a type of a vehicle. To this end, the riding lawnmower vehicle includes a power source (e.g., an electric motor) mounted thereon for wheel driving and lawnmower driving. The electric motor can receive electric power from a power supply source (e.g., a battery). If the riding lawnmower vehicle is a hybrid-type riding lawnmower vehicle, the battery can receive electric power supplied from an electric generator that is driven by an internal combustion engine for electric power generation.

For example, as discussed in Japanese Patent Application Laid-Open No. 2008-168869, a hybrid type riding lawnmower vehicle includes an engine and an electric generator that can supply electric power to a power source unit. The power source unit can supply electrical energy to an electric rotary machine. The riding lawnmower vehicle further includes a main frame that supports right and left wheels operable as main driving wheels and right and left caster wheels operable as steering control wheels. The right and left wheels are connected to an axle driving electric rotary machine. The caster wheels are connected to a steering wheel driving electric rotary machine. Further, a steering actuator that can function as a motor is connected to respective steering shafts of the right and left caster wheels, to cause the right and left caster wheels to rotate around their steering shafts, respectively. Further, a controller is provided to set arbitrary steering angles for respective caster wheels in a state where the steering actuator is connected to the steering shafts.

Furthermore, as discussed in Japanese Patent Application Laid-Open No. 2008-168871, another riding lawnmower vehicle includes right and left main driving wheels, right and left caster wheels operable as two steering control wheels, and the main driving wheels are driven by an electric motor and the caster wheels are steered by an electric steering motor. The controller includes a switching module that switches the operational state between a forced steering mode and a free steering mode. When the switching module selects the forced steering mode, the electric steering motor forcibly steers the caster wheels. On the other hand, in the free steering mode, the switching module brings the caster wheels into a freely steerable state by stopping power generation for the electric traveling motor or stopping power transmission for steering from the electric steering motor to the caster wheels.

According to the riding lawnmower vehicles discussed in Japanese Patent Application Laid-Open No. 2008-168869 and Japanese Patent Application Laid-Open No. 2008-168871, the main driving wheels are driven by the electric motor serving as the axle driving electric rotary machine and the caster wheels are driven by the electric motor serving as the steering control wheel driving electric rotary machine. Further, the electric motor serving as the steering actuator is provided to rotate respective caster wheels around their steering shafts.

However, according to the vehicle discussed in Japanese Patent Application Laid-Open No. 2008-168869, if the steering control wheel driving electric rotary machine and the steering actuator are in a deactivated state, the steering control wheel driving electric rotary machine and the steering actuator apply a significant amount of load to the caster wheels when the caster wheels are forcibly rotated for traveling or steering by the driving force of the main driving wheels. In this respect, there is some room for improvement in reduction of the torque required to drive the main driving wheels.

For example, permanent magnet equipped motors having permanent magnet equipped rotors may be used for the motors functioning as the steering control wheel driving electric rotary machine and the steering actuator. In this case, a cogging torque may be generated as resistance by the magnetic reaction force of the stator positioned in a confronting relationship with the permanent magnet in a situation where the caster wheels are driven by the force acting from the ground when the main driving wheels are driven in a non-energized state of the motors.

The cogging torque is a component that resists the vehicle when the vehicle is traveling. The cogging torque also resists the caster wheels when the caster wheels are in the freely steerable state. Therefore, the cogging torque is not preferable. Therefore, a relatively large amount of electric power is supplied to the axle driving electric rotary machine dedicated to the main driving wheels to cause the vehicle to travel at an intended speed and in an intended direction. In this respect, there is some room for improvement in energy saving.

Further, brush equipped motors or the like (i.e., motors other than the permanent magnet equipped motors) may be used for the motors functioning as the steering control wheel driving electric rotary machine and the steering actuator. In this case, a significant amount of sliding resistance occurs between the brush and a commutator and therefore the vehicle is subjected to a relatively large amount of resistance in the non-energized state of the motors when the vehicle is in a traveling or freely steering state. Thus, there is some room for improvement in energy saving.

Further, according to the vehicle discussed in Japanese Patent Application Laid-Open No. 2008-168871, as understood from a structure illustrated in FIG. 17 of Japanese Patent Application Laid-Open No. 2008-168871, a spur gear that constitutes a spur gear mechanism is supported, via a one-way clutch, around one end portion of a lower side rotary shaft fixed to the caster wheel. The spur gear is operatively connected to a rotary shaft of an electric motor.

According to this arrangement, if there is the tendency for the rotational speed of the spur gear to become slower than the rotational speed of the caster wheel, the power transmission from the electric motor to the lower side rotary shaft is blocked, thereby preventing the electric motor from obstructing smooth rotation of the caster wheels. Hence, there is a possibility that energy saving can be attained to a certain extent by disconnecting the electric motors (i.e., the steering control wheel driving electric rotary machines) when the electric motors are deactivated.

Further, as discussed in Japanese Patent Application Laid-Open No. 2008-168871, when the free steering mode is selected, electric power supply to the electric steering motor can be stopped or power transmission from the electric steering motor to the caster wheel can be blocked. To this end, it is useful to provide a clutch mechanism in a power transmission path between the electric steering motor and a driving portion of the caster wheel.

However, the above described Japanese Patent Application Laid-Open No. 2008-168871 has no mention of any mechanism for preventing the steering motor from obstructing the steering operation of the caster wheel that is driven by the force acting from the ground when the vehicle travels by the driving force of the main driving wheels, in a situation where the caster wheel is freely steerable in the deactivated state of the steering motor. Namely, there is no discussion that suggests the clutch that is capable of blocking transmission of the rotational force in the deactivated state of the electric steering motor.

Therefore, in the configuration discussed in Japanese Patent Application Laid-Open No. 2008-168871, electric power is wastefully consumed if the clutch is disengaged to block the power transmission for the steering operation in the power-supply state of the electric steering motor. There is some room for improvement in energy saving.

SUMMARY

The present invention is intended to provide a riding work vehicle that can effectively save energy in a configuration that includes at least one caster wheel configured to switch its operational state between free traveling and forced traveling and also switch the operational state between free steering and forced steering.

A riding work vehicle according to the present invention includes right and left wheels configured to as main driving wheels that are respectively driven independently for traveling, at least one caster wheel as a steering control wheel whose operational state is selectable between free traveling and forced traveling and also between free steering and forced steering, a working machine that is operable for a work on the ground, a traveling motor configured to drive the caster wheel for traveling, a steering motor configured to steer the caster wheel, a traveling system clutch that is provided in a traveling system power transmission path for transmitting the power from the traveling motor to an axle of the caster wheel and is configured to disable transmission of the rotational force from the axle to the traveling motor in a state where the traveling motor is deactivated, and a steering system clutch that is provided in a steering system power transmission path for transmitting the power between the steering motor and a steering shaft for the caster wheel and is configured to disable transmission of the rotational force from the steering shaft to the steering motor in a state where the steering motor is deactivated.

According to the above described configuration, the operational state of the caster wheel can be selected between the free traveling and the forced traveling by switching the traveling system clutch between an engaged state and a disengaged state. The operational state of the caster wheel can be further selected between the free steering and the forced steering by switching the steering system clutch between an engaged state and a disengaged state. Further, the traveling system clutch can disable transmission of the rotational force from the axle to the traveling motor in a state where the traveling motor is deactivated. The steering system clutch can disable the transmission of the rotational force from the steering shaft to the steering motor in a state where the steering motor is deactivated. Therefore, in a state where each motor is deactivated, the power transmission via a corresponding clutch can be prevented. Therefore, even in a case where there is a tendency for the force to be transmitted from the ground to the motor via the axle of the caster wheel or via the steering shaft when the vehicle is traveling, the present invention can prevent the force from being transmitted to the motor. More specifically, when the caster wheel is in the free traveling or free steering state, the present invention can effectively prevent the motor from acting as resistance for rotation. Accordingly, the present invention can realize a configuration capable of effectively saving energy.

Further, it is preferable that the riding work vehicle according to the present invention includes a steering angle sensor that is provided on a downstream side of the steering system clutch in a power transmission direction of the steering system power transmission path, and is configured to detect the steering angle of the steering shaft or a portion connected to the steering shaft.

According to the above described configuration, in the configuration in which the steering system clutch is provided in the steering system power transmission path, the steering angle of the steering shaft or the portion connected to the steering shaft can be detected regardless of engagement/disengagement of the steering system clutch.

Further, in the riding work vehicle according to the present invention, it is preferable that the steering angle sensor includes a sensor shaft disposed in parallel with the steering shaft, and a gear mechanism provided between the sensor shaft and the steering shaft to transmit the rotation of the steering shaft to the sensor shaft at a rotational speed identical to that of the steering shaft or a rotational speed slower than that of the steering shaft.

According to the above described configuration, the configuration of the portion including the steering shaft and the steering angle sensor can be prevented from being excessively enlarged. Therefore, a portion to be modified to detect the steering angle of the steering shaft can be realized by a relatively simple, compared to the basic configuration. Further, the number of the modified portion can be decreased.

Further, in the riding work vehicle according to the present invention, it is preferable that the traveling system clutch is configured to switch its operational state between an engaged state and a disengaged state according to a control signal input from a control unit.

According to the above described configuration, the traveling system clutch can disable or enable power transmission between the caster wheel and the traveling motor according to the signal supplied from the control unit that reflects a driver's operation or a traveling state of the vehicle. Therefore, in a case where the traveling motor is an electric rotary machine, the traveling system clutch is brought into the engaged state when the vehicle is decelerating, thereby causing the caster wheel to realize the regenerative braking. The rotational force of the caster wheel can be transmitted to the traveling motor. The traveling motor can generate electric power, and thus the riding work vehicle can further save energy.

Further, in the riding work vehicle according to the present invention, it is preferable that the steering system clutch is configured to switch its operational state between an engaged state and a disengaged state according to a control signal input from a control unit.

Further, in the riding work vehicle according to the present invention, in which the steering system clutch is configured to switch its operational state between the engaged state and the disengaged state according to the control signal input from the control unit, it is preferable that the traveling system clutch is configured to switch its operational state between an engaged state and a disengaged state according to a control signal input from the control unit, and the control unit is configured to constantly engage the steering system clutch when the traveling system clutch is engaged.

The above described configuration can effectively prevent the planted lawn from being damaged (or scuffed) by the caster wheel that is driven forcibly when being unexpectedly steered, when the vehicle is turning.

Further, in the riding work vehicle according to the present invention, it is preferable that the traveling system clutch is a one-way clutch.

According to the above described configuration, a control mechanism for the traveling clutch (e.g. a cable connecting the traveling clutch to the control unit) can be omitted.

Further, in the riding work vehicle according to the present invention, it is preferable that the traveling system clutch is a two-way clutch.

According to the above described configuration, the control mechanism for the traveling system clutch can be simplified or can be omitted. For example, a cable connecting the traveling system clutch to the control unit can be omitted.

Further, it is preferable that the riding work vehicle according to the present invention further includes a control unit configured to supply electric power generated by the traveling motor to an electric power storage unit to charge the electric power storage unit if it is determined that a regenerative braking request is present, wherein the control unit is configured to supply electric power to the traveling motor to cause the traveling motor to rotate in a direction opposed to that in a normal traveling state if it is determined that the regenerative braking request is present, thereby causing the traveling motor to generate electric power by the regenerative braking after the traveling system clutch is engaged.

According to the above described configuration, even when the traveling system clutch is constituted by a one-way clutch or a two-way clutch, the rotational force of the caster wheel can be transmitted via the traveling system clutch to the traveling motor. The traveling motor can generate electric power by regenerative braking.

Further, it is preferable that the riding work vehicle according to the present invention further includes a hill-climbing detection sensor configured to detect whether the vehicle is in a hill-climbing state, wherein if it is determined that the vehicle is in the hill-climbing state, the speed of the caster wheel relative to the ground is set to be higher than the speed of the right and left wheels relative to the ground. It is preferable that if it is determined that the vehicle is in the hill-climbing state, the speed of the caster wheel relative to the ground is set to be higher, by the amount equivalent to 20% (more preferably 15%) or less, than the speed of the right and left wheels relative to the ground.

According to the above described configuration, the vehicle can constantly maintain four-wheel drive traveling to prevent frequent switching between a two-wheel driving state and a four-wheel driving state that may occur when the vehicle is in a hill-climbing state because the wheels tend to slip. This configuration can improve ride comfort of the vehicle and realize stable traveling.

Further, in the riding work vehicle according to the present invention, it is preferable that the steering system clutch is a two-way clutch.

According to the above described configuration, the control mechanism for the steering system clutch can be simplified or can be omitted. For example, the cable connecting the steering system clutch to the control unit) can be omitted.

Further, in the riding work vehicle according to the present invention, it is preferable that the steering angle sensor includes a unit to be sensed that is provided on the steering shaft and disposed on the downstream side of the steering system clutch in the power transmission direction of the steering system power transmission path, or provided on another shaft disposed coaxially with the steering shaft and connected to the steering shaft, and a detection unit provided at a position confronting with the unit to be sensed.

As described above, the riding work vehicle according to the present invention is configured to switch the operational state of the caster wheel between the free traveling state and the forced traveling state and also between the free steering state and the forced steering state, and is capable of realizing a configuration that can effectively save energy.

BRIEF DESCRIPTION OF THE DRAWINGS

The accompanying drawings, which are incorporated in and constitute part of the specification, illustrate an embodiment of the invention and, together with the description, serve to explain the principles of the invention.

FIG. 15A illustrates an example of determination of steering angles of caster wheels and the like based on the turning center position according to the first embodiment of the present invention.

FIG. 15B illustrates an example of calculation for determining the steering angles of the caster wheels and the like based on the turning center position according to the first embodiment of the present invention.

FIG. 16 illustrates an example of calculation for determining a caster wheel speed and the like based on the turning center position according to the first embodiment of the present invention.

DESCRIPTION OF EXEMPLARY EMBODIMENTS

[First Embodiment of the Present Invention]

Figure 1:
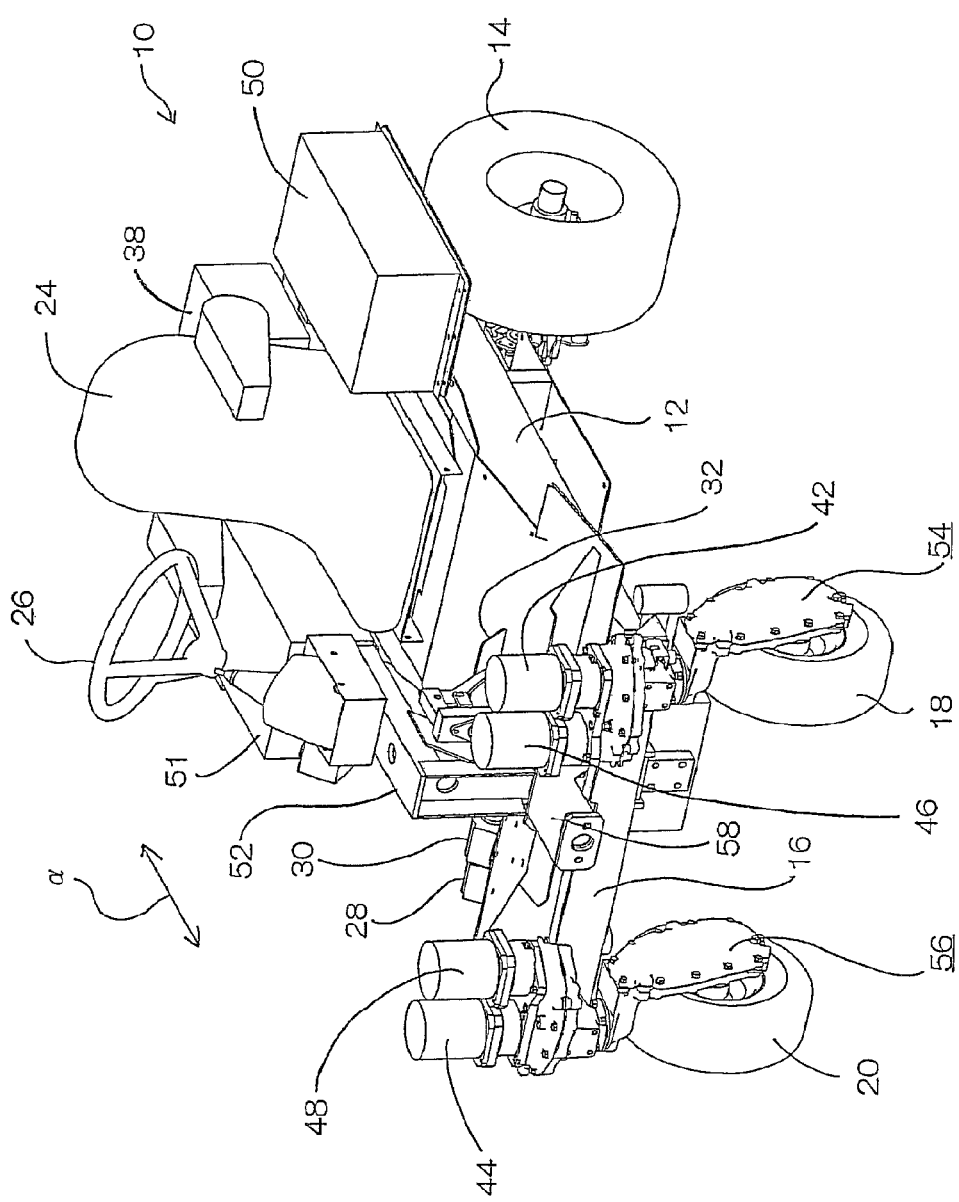
FIG. 1 is a perspective view illustrating a configuration of a lawnmower vehicle, which is a riding work vehicle, according to a first embodiment of the present invention.
Figure 2:
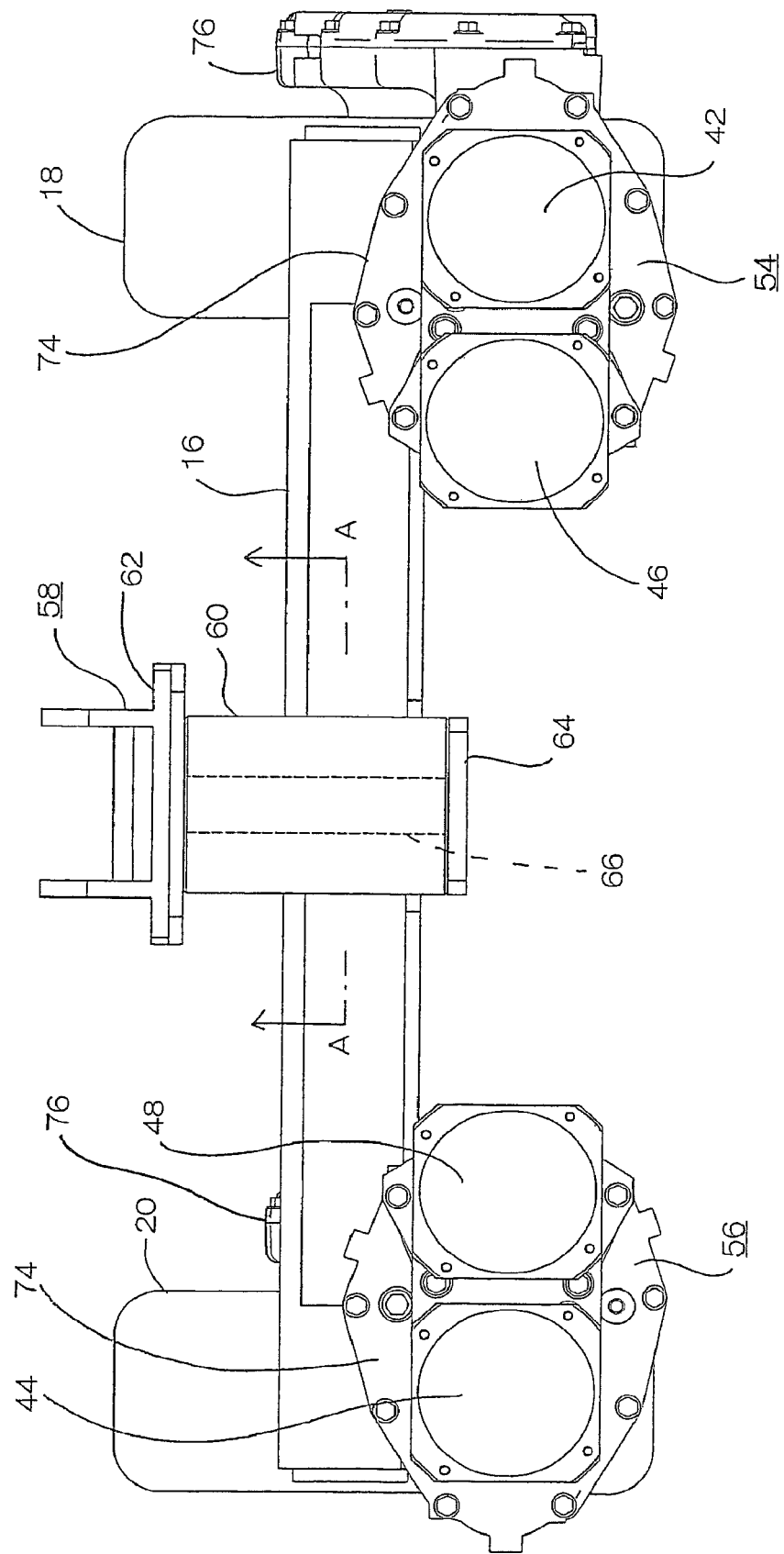
FIG. 2 is a plan view illustrating a swing arm and caster wheel support units attached to each end of the swing arm as illustrated in FIG. 1.
Figure 3:
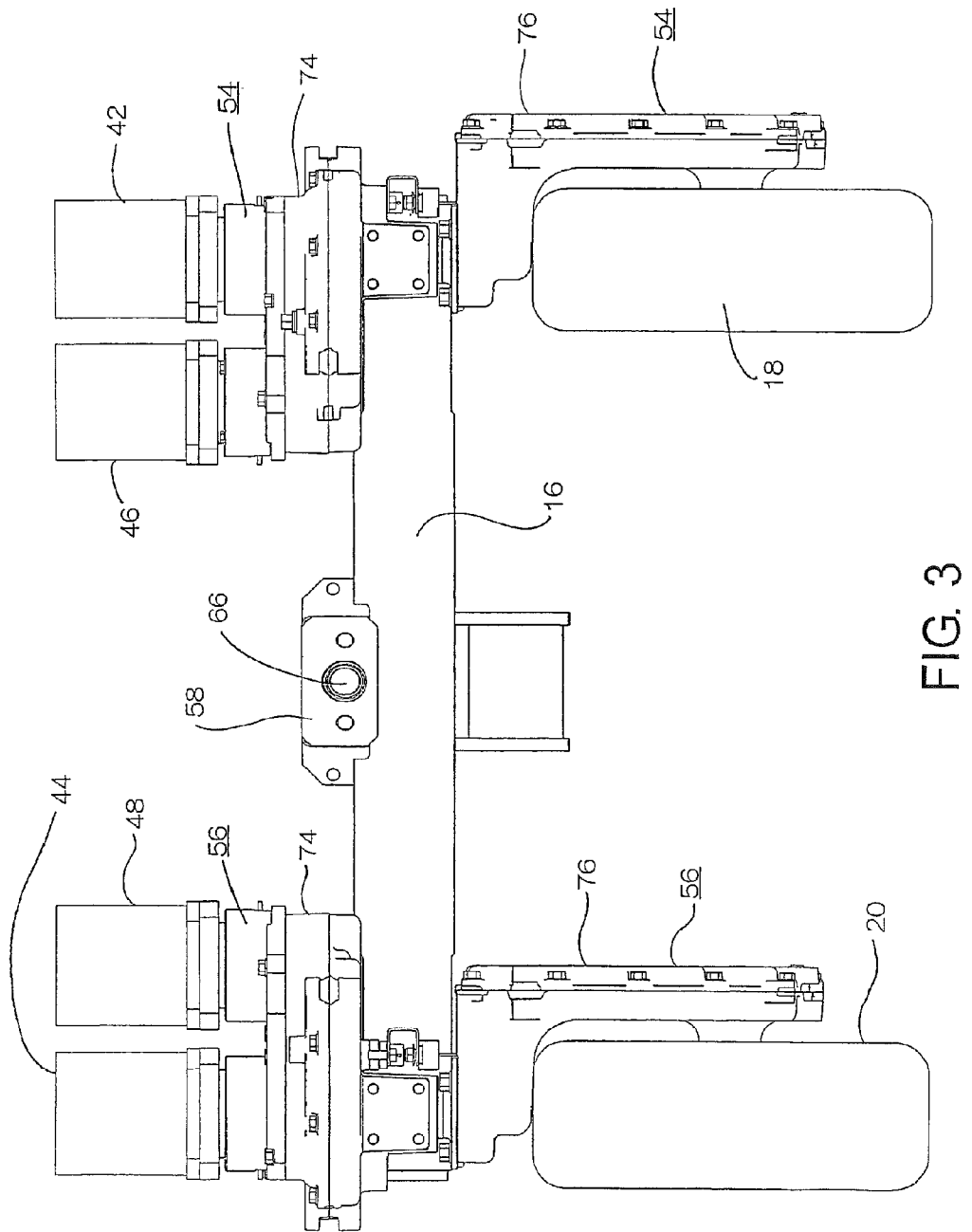
FIG. 3 is a front view illustrating the swing arm and the caster wheel support units illustrated in FIG. 2.
Figure 4:
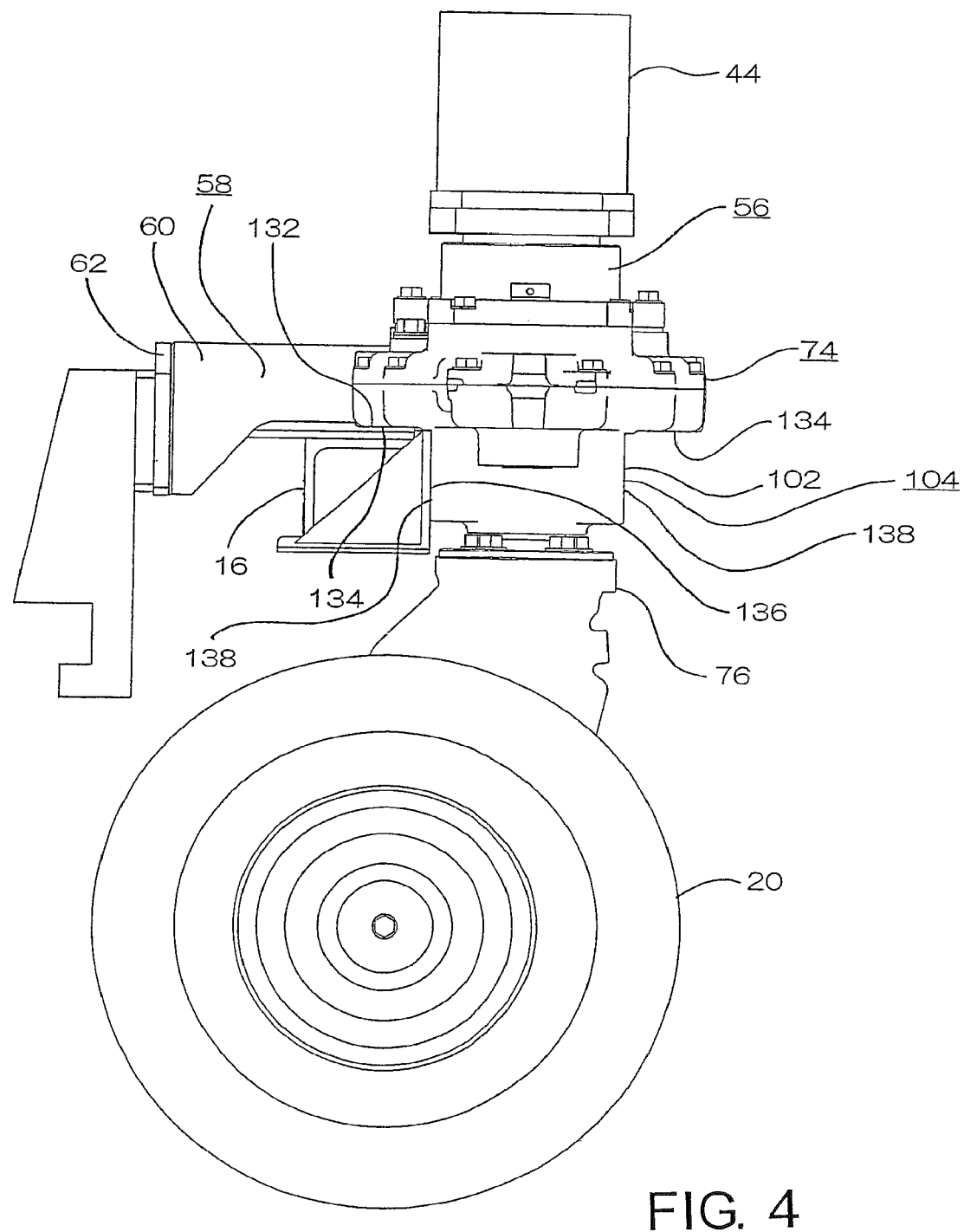
FIG. 4 is a right side view illustrating the swing arm and the caster wheel support units illustrated in FIG. 2.
Figure 5:
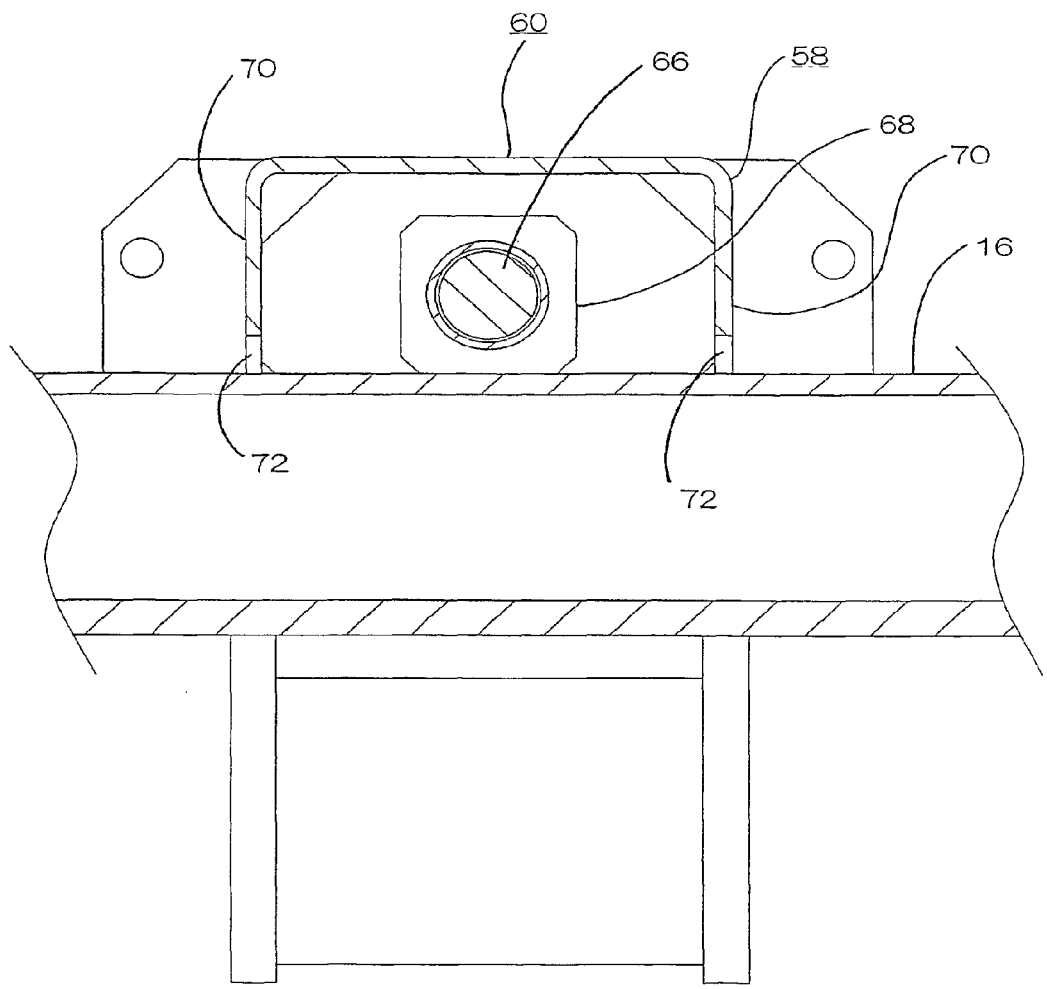
FIG. 5 is an enlarged cross-sectional view taken along a line A-A illustrated in FIG. 2.
Figure 6:
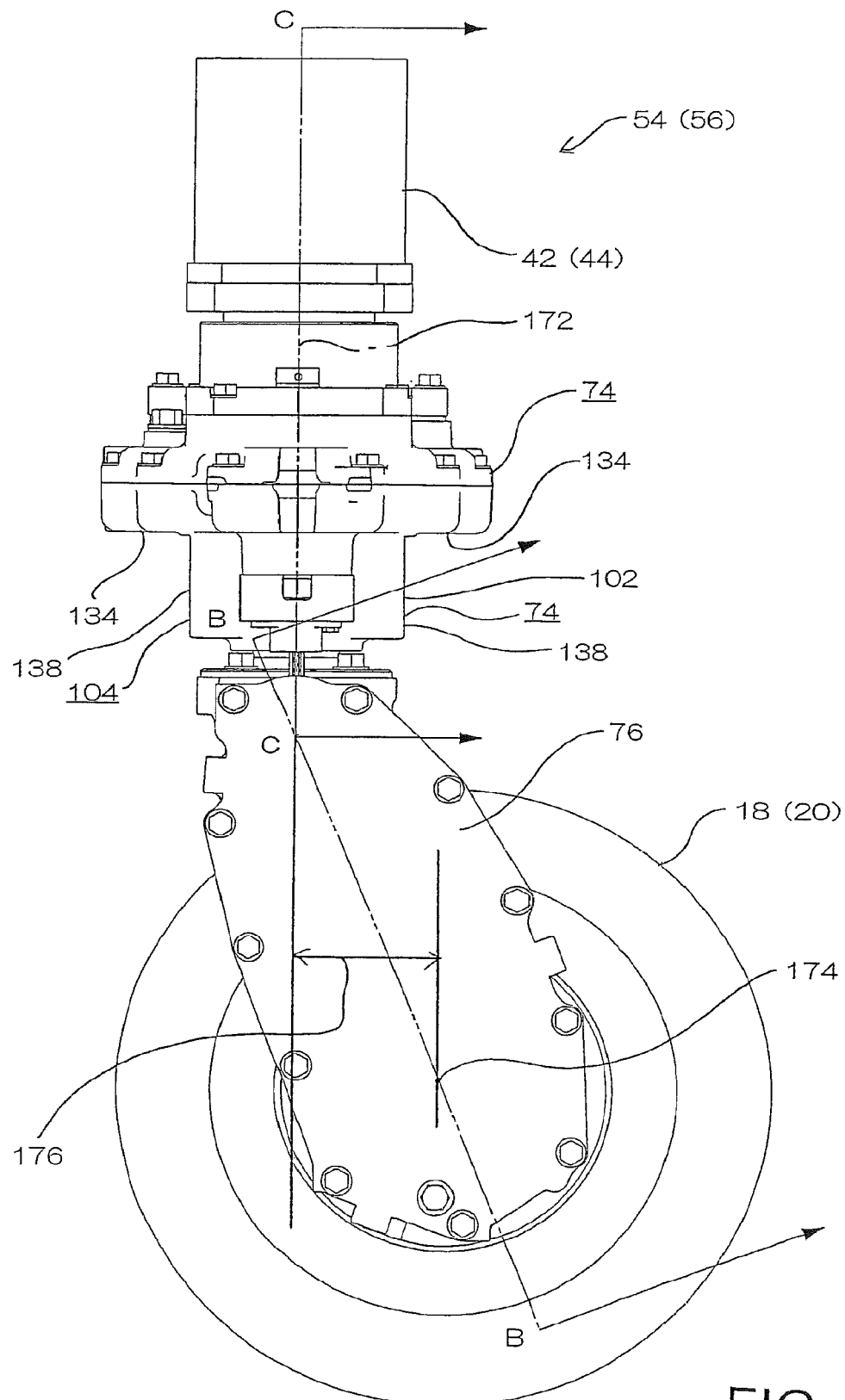
FIG. 6 is a side view illustrating one caster wheel support unit, seen from the vehicle illustrated in FIG. 1.
Figure 7:
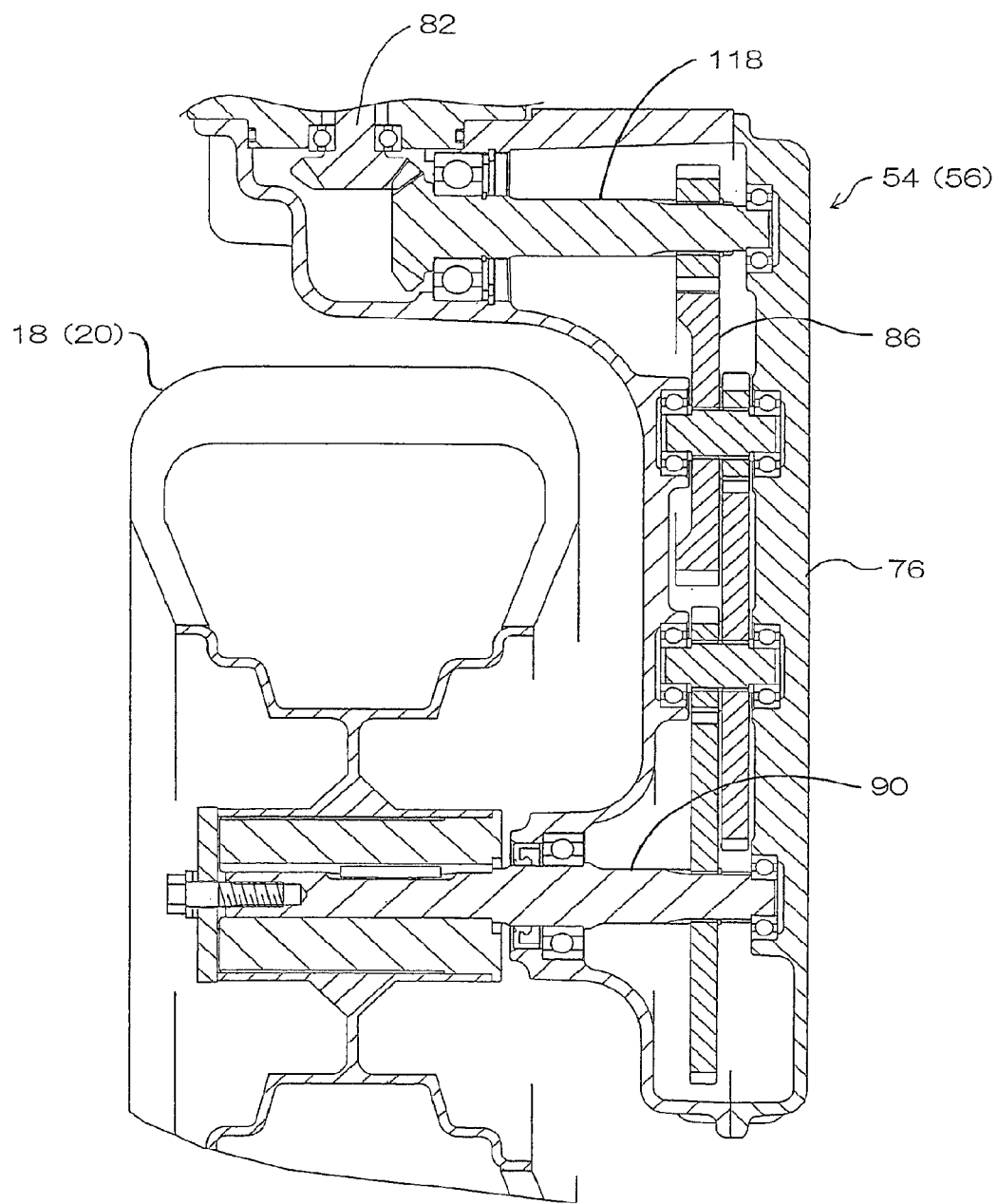
FIG. 7 is a cross-sectional view taken along a line B-B illustrated in FIG. 6.
Figure 8:
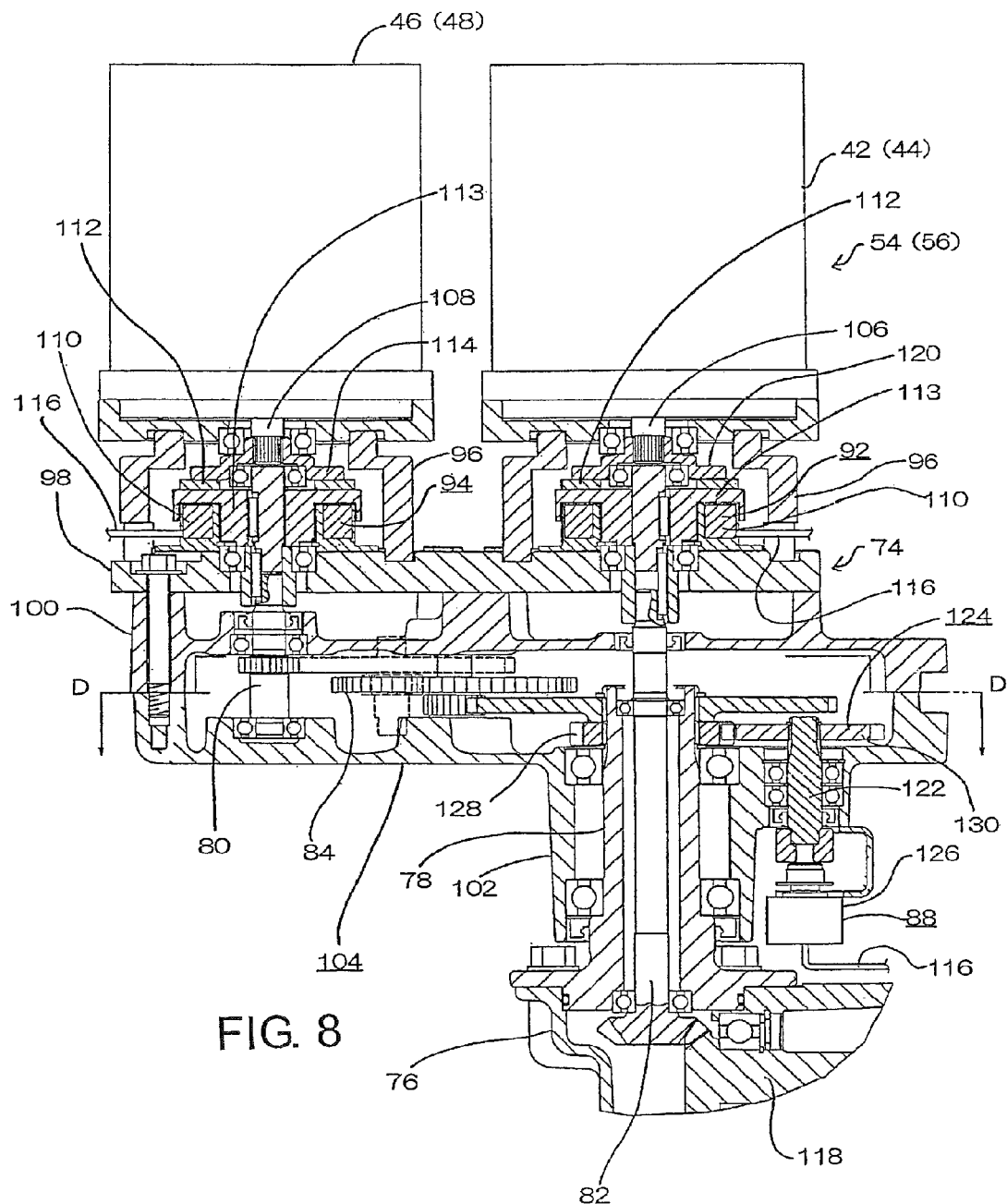
FIG. 8 is a cross-sectional view taken along a line C-C illustrated in FIG. 6.
Figure 9:
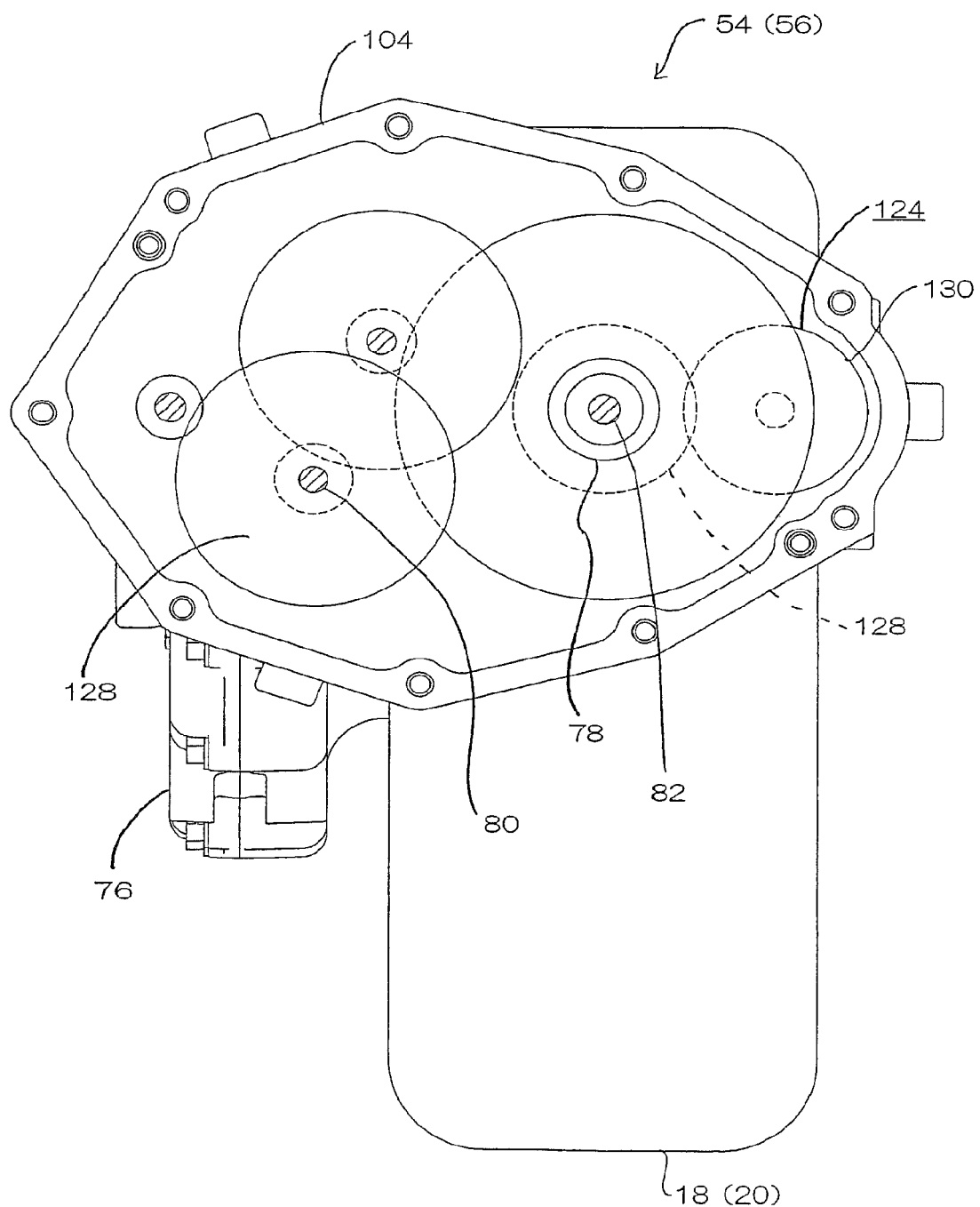
FIG. 9 is a cross-sectional view taken along a line D-D illustrated in FIG. 8, which illustrates a caster wheel attached portion of a rotatable housing in a state reversed in the right-and-left direction with respect to a traveling system power transmission shaft.
Figure 10:
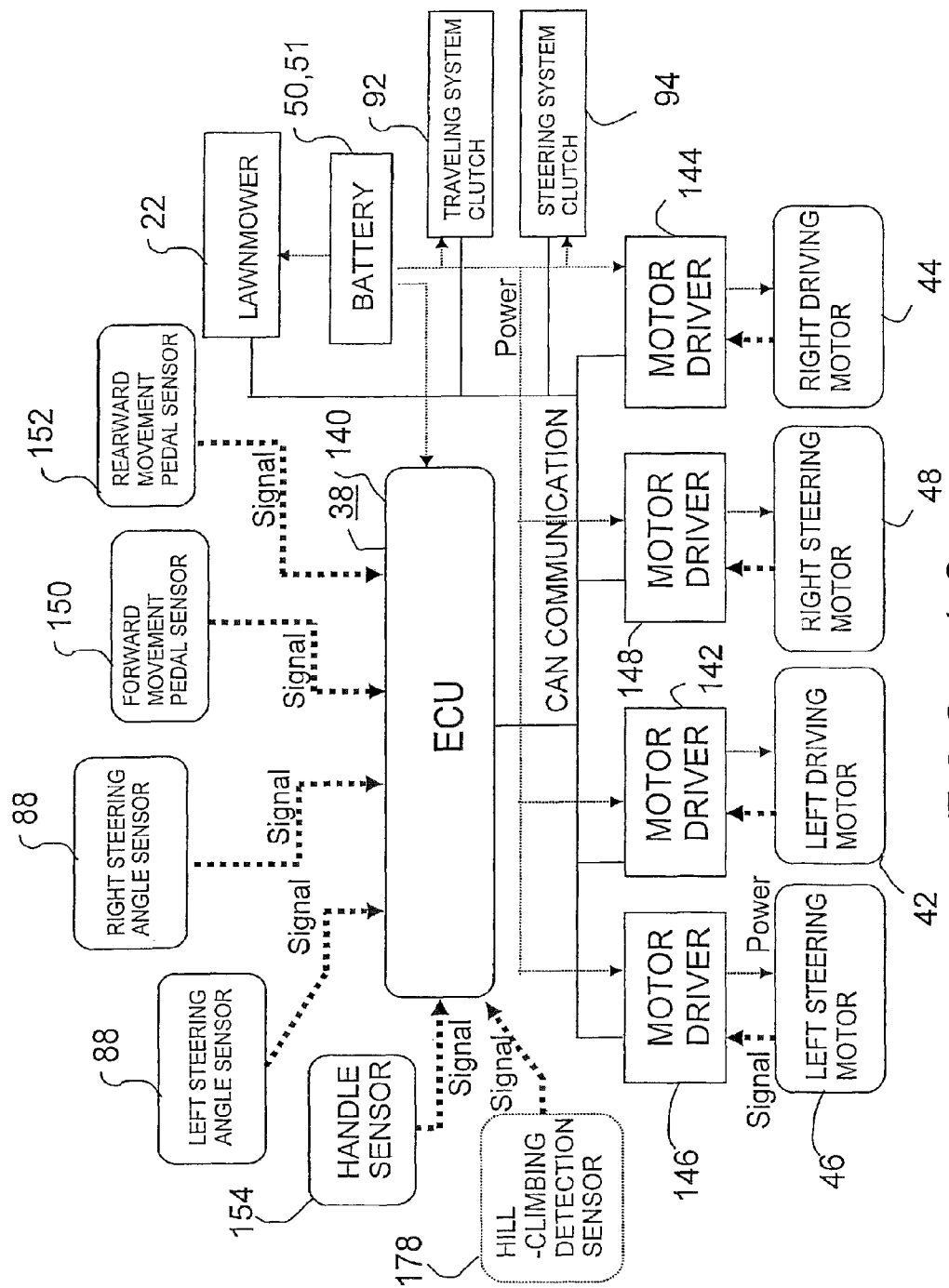
FIG. 10 illustrates a fundamental configuration relating to constituent components of an electric system, which includes a controller, provided in the lawnmower vehicle according to the first embodiment of the present invention.
Figure 11:
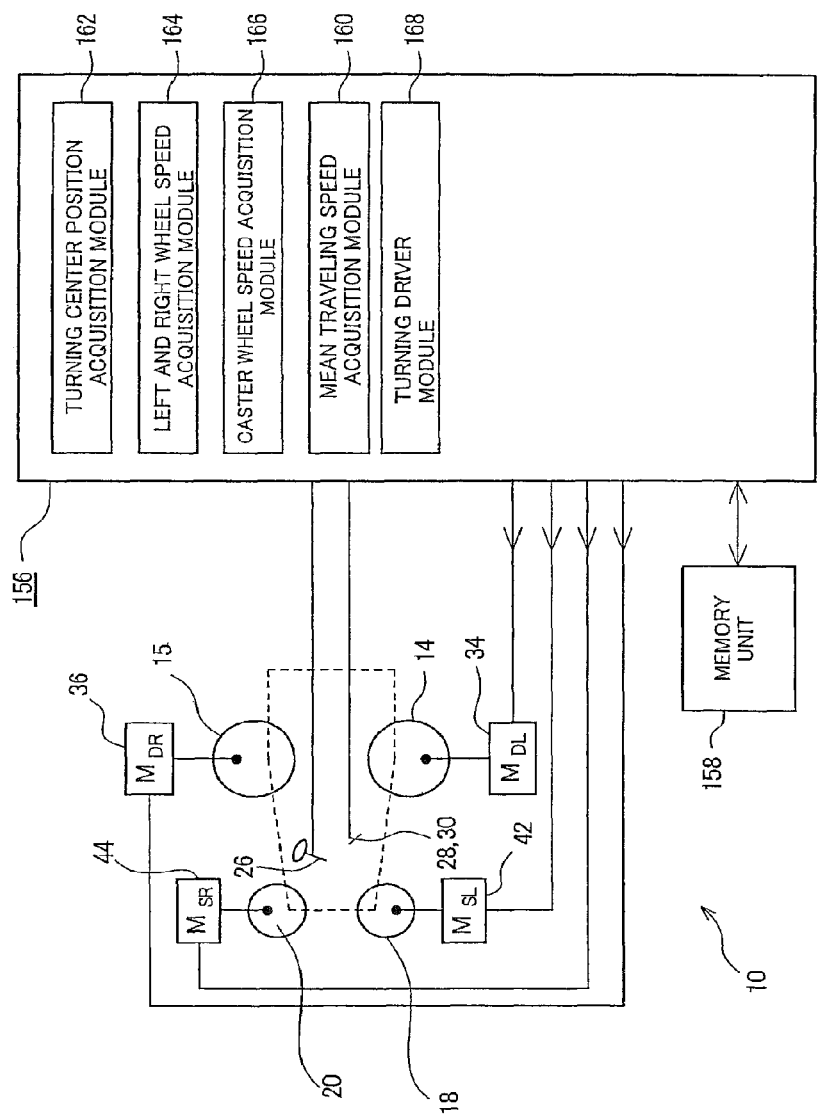
FIG. 11 is a block diagram illustrating a portion relating to a turning function of the lawnmower vehicle illustrated in FIG. 1.
Figure 12:
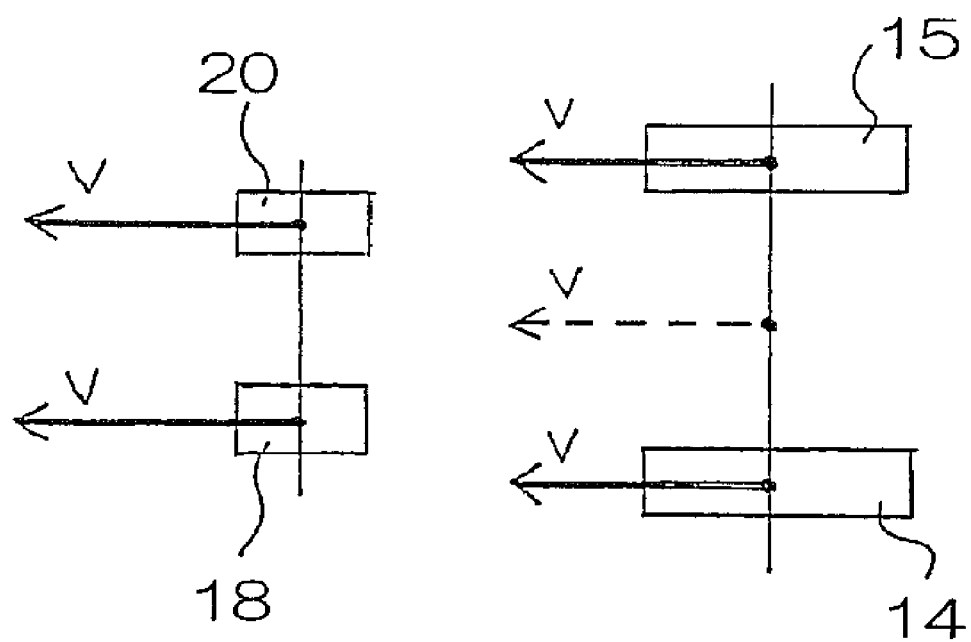
FIG. 12 illustrates an example of linear traveling according to the first embodiment of the present invention.
Figure 13A:
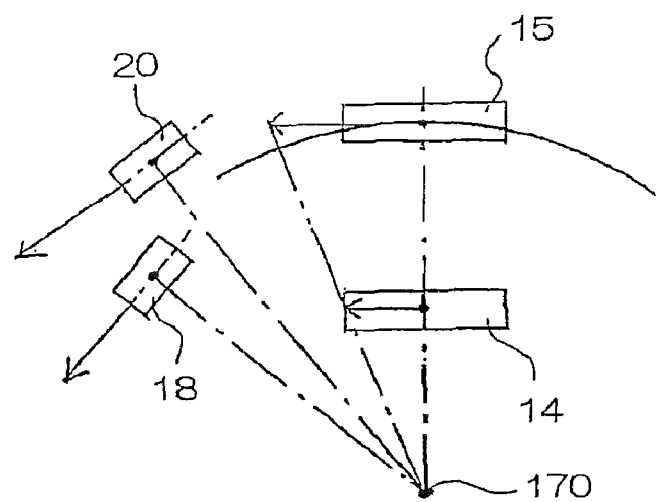
FIG. 13A illustrates an example of turn traveling according to the first embodiment of the present invention.
Figure 13B:
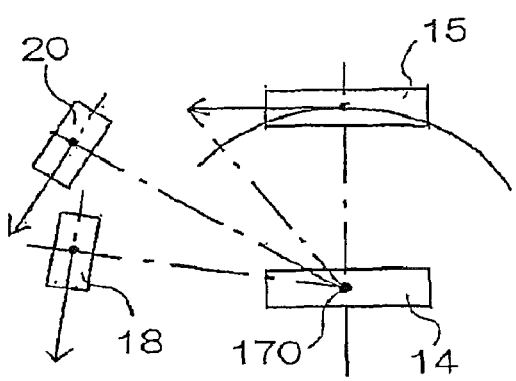
FIG. 13B illustrates another example of turn traveling according to the first embodiment of the present invention.
Figure 13C:
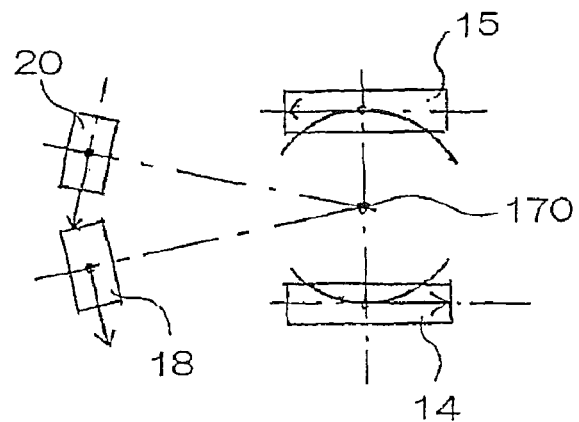
FIG. 13C illustrates another example of turn traveling according to the first embodiment of the present invention.
Figures 14A, 14B:
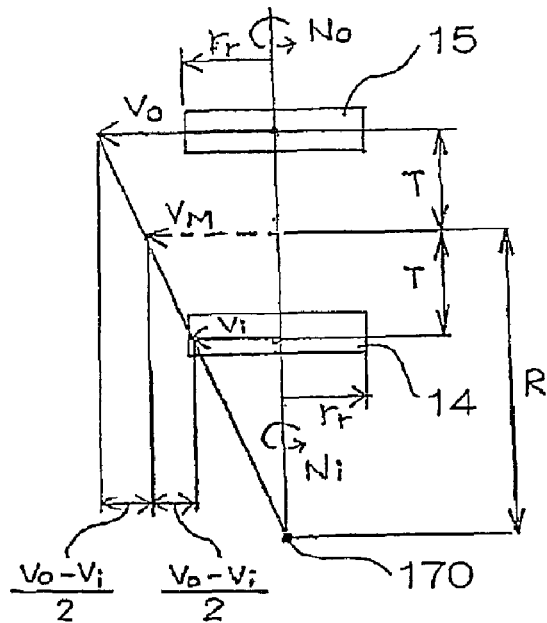
FIG. 14A illustrates an example of determination of a turning center position in response to a given turning instruction according to the first embodiment of the present invention.
FIG. 14B illustrates an example of calculation for determining the turning center position in response to the given turning instruction according to the first embodiment of the present invention.

A first embodiment of the present invention is described below in detail with reference to attached drawings. FIG. 1 is a perspective view illustrating a configuration of a lawnmower vehicle, which is a riding work vehicle according to the first embodiment of the present invention. FIG. 2 is a plan view illustrating a swing arm and caster wheel support units attached to each end of the swing arm as illustrated in FIG. 1. FIG. 3 is a front view illustrating the swing arm and the caster wheel support unit illustrated in FIG. 2. FIG. 4 is a side view illustrating a swing arm and one caster wheel support unit, seen from the vehicle illustrated in FIG. 1. FIG. 5 is an enlarged cross-sectional view taken along a line A-A illustrated in FIG. 2. FIG. 6 is a side view illustrating one caster wheel support unit, seen from the vehicle illustrated in FIG. 1. FIG. 7 is a cross-sectional view taken along a line B-B illustrated in FIG. 6. FIG. 8 is a cross-sectional view taken along a line C-C illustrated in FIG. 6. FIG. 9 is a cross-sectional view taken along a line D-D illustrated in FIG. 8, which illustrates a caster wheel attached portion of a rotatable housing in a state reversed in the right-and-left direction with respect to a traveling system power transmission shaft. FIG. 10 illustrates a fundamental configuration relating to constituent components of an electric system, which includes a controller, provided in the lawnmower vehicle according to the first embodiment of the present invention. FIG. 11 is a block diagram illustrating a portion relating to a turning function of the lawnmower vehicle illustrated in FIG. 1. FIG. 12 illustrates an example of linear traveling according to the first embodiment of the present invention. FIG. 13A illustrates an example of turn traveling according to the first embodiment of the present invention. FIG. 13B illustrates another example of turn traveling according to the first embodiment of the present invention. FIG. 13C illustrates another example of turn traveling according to the first embodiment of the present invention. FIG. 14A illustrates an example of determination of a turning center position in response to a given turning instruction according to the first embodiment of the present invention. FIG. 14B illustrates an example of calculation for determining the turning center position in response to the given turning instruction according to the first embodiment of the present invention. FIG. 15A illustrates an example of determination of steering angles of caster wheels and the like based on the turning center position according to the first embodiment of the present invention. FIG. 15B illustrates an example of calculation for determining the steering angles of the caster wheels and the like based on the turning center position according to the first embodiment of the present invention. FIG. 16 illustrates an example of calculation for determining a caster wheel speed and the like based on the turning center position according to the first embodiment of the present invention.

In the following description, a lawnmower vehicle includes a plurality of electric motors, which are electric rotary machines (i.e., driving sources). More specifically, the lawnmower vehicle includes a driving source dedicated to right and left wheels (i.e., rear wheels that serve as main driving wheels). The lawnmower vehicle further includes a driving source for travelling and a driving source for steering dedicated to right and left caster wheels operable as front wheels. Additionally, the lawnmower vehicle further includes a driving source for a lawnmower blade or a lawnmower reel, which is a lawnmower rotary tool constituting a lawnmower. The driving sources are not limited to the electric motors and are replaceable with hydraulic motors or any other driving sources. In the following description of the present invention, the "left and right" direction and the "back and forth" direction represent corresponding directions of the lawnmower vehicle, unless specifically stated otherwise.

Further, in the following description, a battery (i.e., an electric power storage unit) is a power source unit capable of supplying electric power to each electric motor. If the lawnmower vehicle is configured as a hybrid-type riding lawnmower vehicle, an internal combustion engine can be used and an electric generator can be driven by the engine to supply generated electric power to the battery. Further, an appropriate power transmission mechanism can be employed to transmit driving power from an output shaft of the engine to the lawnmower blade, so that the engine can be used as a driving source for the lawnmower blade when the hybrid-type riding lawnmower vehicle is employed.

Further, each of the electric motor serving as the driving source dedicated to the right and left wheels and the electric motor serving as the driving source dedicated to the caster wheels can generate driving force to rotate respective wheels or respective caster wheels by supplying electric power to each of the electric motor. On the other hand, when the wheels or the caster wheels are in a decelerating state, these motors can function as electric generators capable of recovering regenerative energy.

Further, the power source unit is not limited to the electric power storage unit configured to receive charging power from an external device. The power source unit can be replaced by, or can be used together with, a fuel cell unit or a solar battery or the like that has a power generation function.

Moreover, the layout of various components constituting the lawnmower vehicle can be appropriately changed according to practical specifications of the lawnmower vehicle. An example of the lawnmower vehicle is described below in detail with reference to the attached drawings.

As illustrated in FIG. 1, a lawnmower vehicle 10 is a self-propelled off-road vehicle, which includes a main frame 12 that supports, at the rear end portion (i.e., the right side portion in FIG. 1) thereof, left and right wheels 14 and 15

(although only the left wheel 14 is illustrated in FIG. 1 and FIG. 11 can be referred to for the right wheel 15) that are two main driving wheels respectively driven independently for traveling. The main frame 12 has a front end portion (i.e., a left end portion in FIG. 1) that supports a swing arm 16 that can swing. The lawnmower vehicle 10 includes left and right caster wheels 18 and 20 (i.e., two steering control wheels) that are supported at both end portions of the swing arm 16 in the right-and-left direction.

The lawnmower vehicle 10 further includes a lawnmower (or a mower) 22, which is illustrated in FIG. 10 although not illustrated in FIG. 1. The lawnmower 22 is provided between the caster wheels 18 and 20 and the left and right wheels 14 and 15 in the back-and-forth direction of the main frame 12 (i.e., the direction indicated by an arrow α in FIG. 1). The lawnmower 22 is a working machine usable for a job on the ground.

The lawnmower 22 is operatively connected to an electric mower motor (or a hydraulic motor), which serves as a power source for driving the lawnmower 22, although it is not illustrated. For example, the electric mower motor (or the hydraulic motor) is operatively connected to the lawnmower 22 via a gear mechanism (not illustrated), or a universal joint and a transmission shaft, so that the power of the motor can be transmitted to the lawnmower 22.

The lawnmower rotary tool, which constitutes the lawnmower 22, is disposed in a mower deck (not illustrated). The lawn grass having been cut by the lawnmower rotary tool can be directly discharged to the side of the lawnmower. In a case where a discharge duct (not illustrated) is provided, the grass cut by the lawnmower 22 can be discharged rearward via the discharge duct to a grass collection tank (not illustrated) that is connected to the rear end of the discharge duct and mounted on a vehicle body.

Further, the lawnmower rotary tool of the lawnmower 22 can be a lawnmower blade type that includes a rotary shaft extending vertically relative to the ground surface and one or a plurality of blades disposed around the rotary shaft and rotatable to cut the lawn. Alternatively, the lawnmower rotary tool of the lawnmower 22 can be a lawnmower reel type that includes a cylinder having a rotary shaft extending in parallel with the ground surface and a helical blade disposed in the cylinder to sandwich and cut the lawn.

A driver's seat 24 is provided on the upper surface side of the main frame 12. A steering operator 26 is provided on the front side of the driver's seat 24. Further, a forward movement accelerator pedal 28 and a rearward movement accelerator pedal 30, which can be operated to accelerate the lawnmower vehicle 10, are provided on the front side of the driver's seat 24. Similarly, a brake pedal 32, which can be operated to decelerate the lawnmower vehicle 10, is provided on the front side of the driver's seat 24.

The steering operator 26 is, for example, a circular or C-shaped steering wheel, which can be operated to instruct turning. The steering operator 26, which is configured to be rotatable or swingable, has a function of adjusting the turning direction of the vehicle. For example, in a case where the steering operator 26 is a steering wheel, the steering operator 26 can rotate an arbitrary angle around its rotary shaft (i.e., the rotational center) in the clockwise direction or in the counterclockwise direction. The positional relationship between the accelerator pedals 28 and 30 in the right-and-left direction can be reversed if desired. Although the illustrated example of the accelerator pedal is a combination of the forward movement accelerator pedal 28 and the rearward movement accelerator pedal 30, the accelerator pedal can be constituted by a single pedal that is swingable around and supported by a horizontal shaft fixed to the main frame 12. In this case, if the front side of the accelerator pedal is depressed, the accelerator pedal can function as a forward movement accelerator pedal. If the rear side of the accelerator pedal is depressed, the accelerator pedal can function as a rearward movement accelerator pedal.

Further, the left and right wheels 14 and 15 (i.e., rear wheels) can be respectively driven by two wheel driving motors 34 and 36 (see FIG. 11), which are electric motors capable of driving respective wheels 14 and 15 for traveling. More specifically, the wheel driving motors 34 and 36 have rotary shafts that can independently drive the left and right wheels 14 and 15, respectively. Each of the wheel driving motors 34 and 36 can be a permanent magnet equipped DC brushless motor, a brush equipped motor, or the like, which can rotate in both forward and reverse directions. A controller 38, which is a below-described control unit, can control the rotational speed (i.e., the number of revolutions per unit time) of respective wheel driving motors 34 and 36.

Further, the left and right caster wheels 18 and 20 (i.e., front wheels) can be respectively driven by two traveling motors 42 and 44, which are electric motors capable of driving respective caster wheels 18 and 20 for traveling. Further, the left and right caster wheels 18 and 20 can be respectively driven by two steering motors 46 and 48, which are electric motors capable of steering respective caster wheels 18 and 20. Each of the traveling motors 42 and 44 and the steering motors 46 and 48 is, for example, a permanent magnet equipped DC brushless motor, a brush equipped motor, or the like, which can rotate in both forward and reverse directions to drive or steer the load (i.e., the wheel). At least one of two batteries 50 and 51, which are power source units disposed at left and right sides of the driver's seat 24 and the upper side of the main frame 12, can supply electric power to the above described motors 34, 36, 42, 44, 46, and 48.

Further, although not illustrated in the drawings, a starter switch that serves as an operation unit configured to operate the lawnmower 22, and a parking brake lever or a similar manipulator that serves as a parking brake mechanism configured to hold a stopped state of the vehicle, can also be provided in the vicinity of the driver's seat 24. The steering operator 26 is not limited to the above described steering wheel and can be a two-lever type operator that includes two operation levers separately provided on the right and left sides to enable a worker sitting on the driver's seat 24 to turn, accelerate, and decelerate the lawnmower vehicle 10. In this case, the accelerator pedals 28 and 30 can be omitted.

Further, the controller 38 is disposed at an appropriate position on the upper surface side or the bottom surface side of the main frame 12. The controller 38 integrally controls various operations to be performed by constituent components of the vehicle including the batteries 50 and 51 and the motors including the wheel driving motors 34 and 36. The controller 38 is an electric circuit including electric components that can be separately provided at different portions, that is different from other mechanism components. According to the example illustrated in FIG. 1, only one controller 38 is disposed on the rear side of the driver's seat 24 and on the upper surface side of the main frame 12.

Alternatively, the controller 38 can be constituted by a plurality of control units that are separately disposed at different portions and mutually connected via appropriate signal cables. The controller 38 includes a driver circuit, such as an inverter circuit used for the wheel driving motors 34 and 36 and other motors, and also includes a control logic circuit, such as a central processing unit (CPU). Although the illustrated example includes two batteries 50 and 51 mounted on the vehicle, only one battery can be provided.

Further, the front end portion of the main frame 12 supports, via the swing arm 16, the left and right caster wheels 18 and 20. More specifically, an upright frame 52 is fixed at the center of the main frame 12 in the right-and-left direction. The upright frame 52 has an upper side that supports a rotary supporting portion of the steering operator 26. The upright frame 52 has a front end portion that supports the swing arm 16 so as to be swingable around a back-and-forth shaft extending in the back-and-forth direction and in the horizontal direction. Left and right caster wheel support units 54 and 56, which support the caster wheels 18 and 20 that are rotatable, are fixed to both end portions of the swing arm 16.

More specifically, a protruding member 58 extending in the back-and-forth direction is fixed to the front end portion of the upright frame 52 provided on the front side of the main frame 12. As illustrated in FIG. 2 to FIG. 5, the protruding member 58 includes an intermediate bracket 60 having a U-shaped configuration in cross section with an opened lower side, and a mounting bracket 62 fixed to the rear end portion (i.e., the upper end portion illustrated in FIG. 2) of the intermediate bracket 60 so as to close the rear end opening of the intermediate bracket 60. The protruding member 58 further includes a plate portion 64 fixed to the front end portion (i.e., the lower end portion illustrated in FIG. 2) of the intermediate bracket 60 so as to close the front end opening of the intermediate bracket 60, and a shaft 66 (i.e., back-and-forth shaft) having both end portions fixed to the mounting bracket 62 and the plate portion 64 so as to extend in the intermediate bracket 60 in the back-and-forth direction. The mounting bracket 62 is fixed to the upright frame 52 by means of bolts. Further, as illustrated in FIG. 5, a shaft supporting bracket 68 is supported by and rotatable around the shaft 66. The shaft supporting bracket 68 has a lower end portion fixed to the swing arm 16 that extends in the right-and-left direction. The above described configuration enables the swing arm 16 to swing around the shaft 66 that extends in the back-and-forth direction and in the horizontal direction at the front end portion of the main frame 12 (see FIG. 1).

Further, as illustrated in FIG. 5, in a state where the swing arm 16 is swingably supported by the protruding member 58 via the shaft 66, a clearance 72 is provided between an upper end surface of the swing arm 16 and the lower end periphery of a pair of wall portions 70 provided at the right and left ends of the intermediate bracket 60. The lower end periphery of each wall portion 70 can function as a swing stopper that restricts a swingable range of the swing arm 16. More specifically, the swing stopper capable of regulating the swingable range of the swing arm 16 is provided between the swing arm 16 and a portion fixed to the main frame 12.

Further, as illustrated in FIG. 2 to FIG. 4, the left and right caster wheel support units 54 and 56 are fixed to the left and right end portions of the swing arm 16 by means of appropriate fastening members (e.g., bolts). As illustrated in detail in FIG. 6 to FIG. 9, each of the caster wheel support units 54 and 56 includes a stationary housing 74, the traveling motor 42 (or 44) and the steering motor 46 (or 48) that are fixed on the upper side of the stationary housing 74, a rotatable housing 76, the steering shaft 78, a steering system power transmission shaft 80, a traveling system power transmission shaft 82 (i.e., driving shaft), a steering system gear mechanism 84, a traveling system gear mechanism 86, a steering angle sensor 88, the caster wheels 18 and 20, an axle 90, a traveling system clutch 92, and a steering system clutch 94. Two caster wheel support units 54 and 56 are components that are identical to each other. The caster wheel support units 54 and 56 are mutually symmetrical with respect to the center line of the vehicle body extending in the back-and-forth direction, and are fixedly attached to the front and upper surfaces of the swing arm 16 (see FIG. 1) by fastening members (e.g., bolts).

As illustrated in FIG. 8, the stationary housing 74 includes right and left cylindrical motor connection members 96, a planar upper side member 98, an intermediate member 100 having upper and lower recessed portions, and a lower side member 104 having an upper recessed portion and a tube-like portion 102 that protrudes downward at one end in the right-and-left direction, which are assembled in the up-and-down direction and fastened together by means of bolts. Two motor casings constituting the steering motor 46 and the traveling motor 42 are fixed via respective motor connection members 96 to left and right separated portions on the upper side of the upper side member 98. In this state, the motors 46 and 42 have rotary shafts 106 and 108 that extend in the vertical direction. The rotary shafts 106 and 108 are rotatably supported by respective motor casings. Further, the lower end portions of the rotary shafts 106 and 108 of the corresponding motors 46 and 42 are inserted into the upper portions of the motor connection members 96.

In the stationary housing 74, the steering system power transmission shaft 80 is disposed coaxially with the rotary shaft 108 of the steering motor 46. The steering system power transmission shaft 80 is rotatably supported by the stationary housing 74 and is positioned beneath the rotary shaft 108. The lower end of the rotary shaft 108 is opposed via a clearance to the upper end of the steering system power transmission shaft 80. The steering system power transmission shaft 80, as illustrated in FIG. 8, can be constituted by two coaxial shafts that are mutually fixed with a key and are synchronously rotatable. Further, the steering system clutch 94 can mechanically, i.e., operatively, connect the rotary shaft 108 to the steering system power transmission shaft 80.

More specifically, the steering system clutch 94 is an electromagnetic clutch that includes an exciting member 110 (e.g., a solenoid), a displacement member 112, and a shaft-rotation synchronizing member 113. When the steering system clutch 94 is connected, i.e., when electric power is supplied to the exciting member 110, the displacement member 112 moves downward to the upper side of the exciting member 110 due to the magnetic force generated by the exciting member 110. The power of a rotary member 114 that rotates synchronously with the rotary shaft 108 is transmitted to the shaft-rotation synchronizing member 113. The shaft-rotation synchronizing member 113 can engage, via a key, with the upper cylindrical surface of the steering system power transmission shaft 80 and can rotate synchronously with the steering system power transmission shaft 80. The displacement member 112 is supported by the steering system power transmission shaft 80 and can move in the up-and-down direction relative to the steering system power transmission shaft 80. The displacement member 112 and the rotary member 114 are connected via a plate spring (not illustrated), which is an elastic member having a tensile spring function.

When no electric power is supplied to the exciting member 110 (i.e., in non-energized state), the displacement member 112 moves upward due to the elastic force of the plate spring. As a result, a clearance is formed between the displacement member 112 and the shaft-rotation synchronizing member 113. On the other hand, when electric power is supplied to the exciting member 110 (i.e., in energized state), the displacement member 112 moves downward and, as a result, the lower surface of the displacement member 112 is firmly brought into contact with the upper surface of the shaft-rotation synchronizing member 113. Thus, the displacement member 112 and the shaft-rotation synchronizing member 113 can rotate synchronously. Accordingly, if the displacement member 112 rotates in accordance with the rotation of the steering motor 46, the steering system power transmission shaft 80 and the shaft-rotation synchronizing member 113 rotate together in synchronization with the displacement member 112.

The steering system clutch 94 can switch its operational state between an engaged state (i.e., ON) and a disengaged state (i.e., OFF) according to a control signal supplied from the controller 38 (see FIG. 1). In a case where the steering system clutch 94 is in the engaged state, the power of the rotary shaft 108 can be transmitted to the steering system power transmission shaft 80. In a case where the steering system clutch 94 is in the disengaged state, the power of the rotary shaft 108 cannot be transmitted to the steering system power transmission shaft 80. To this end, the steering system clutch 94 and the controller 38 are connected via a cable 116.

Further, the steering shaft 78 having a cylindrical body extending in the vertical direction is rotatably supported by an inside surface of the tube-like portion 102 provided on the lower side of the lower side member 104. The steering shaft 78 has a lower end portion that protrudes from the lower end of the tube-like portion 102 and is fixed to an upper end portion of the rotatable housing 76. Further, the steering system gear mechanism 84 is provided between the steering system power transmission shaft 80 and the steering shaft 78. The steering system gear mechanism 84 can transmit the rotation of the steering system power transmission shaft 80 to the steering shaft 78. According to the illustrated example, the steering system gear mechanism 84 includes a plurality of spur gears. Further, as illustrated in FIG. 7, the axle 90 extending in the horizontal direction is rotatably supported at the lower side of the rotatable housing 76. The caster wheel 18 (or 20) attached to the axle 90 can rotate integrally with the axle 90.

Further, as illustrated in FIG. 8, the rotary shaft 108 of the steering motor 46, the rotary member 114, the steering system clutch 94, the steering system power transmission shaft 80, the steering system gear mechanism 84, and the steering shaft 78 cooperatively constitute a steering system power transmission path. According to this configuration, the steering system clutch 94 provided in the steering system power transmission path can selectively transmit the power between the steering motor 46 and the steering shaft 78. Further, the steering system clutch 94 can prevent the rotational force of the steering shaft 78 from being transmitted to the steering motor 46 in a state where no electric power is supplied to the steering motor 46, namely in a state where the driving operation of the steering motor 46 is stopped.

Further, in the stationary housing 74, the traveling system power transmission shaft 82 is disposed coaxially with the rotary shaft 106 of the traveling motor 42. The traveling system power transmission shaft 82 is rotatably supported by stationary housing 74 and is positioned beneath the rotary shaft 106. The lower end of the rotary shaft 106 is opposed via a clearance to the upper end of the traveling system power transmission shaft 82. The traveling system power transmission shaft 82, as illustrated in FIG. 8, can be constituted by two coaxial shafts that are mutually fixed with a key and are synchronously rotatable. Further, the traveling system clutch 92 can mechanically, i.e., operatively, connect the rotary shaft 106 to the traveling system power transmission shaft 82. More specifically, the traveling system clutch 92 is an electromagnetic clutch that includes an exciting member 110, a displacement member 112, and a shaft-rotation synchronizing member 113, which are similar to those of the above described steering system clutch 94.

The shaft-rotation synchronizing member 113 can engage with the upper cylindrical surface of the traveling system power transmission shaft 82 and can rotate synchronously with the traveling system power transmission shaft 82. The displacement member 112 is supported by the traveling system power transmission shaft 82 and can move in the up-and-down direction relative to the traveling system power transmission shaft 82. The displacement member 112 and a rotary member 120 that can rotate synchronously with the rotary shaft 106 are connected via a plate spring (not illustrated), which is an elastic member having a tensile spring function.

When no electric power is supplied to the exciting member 110 (i.e., in non-energized state), the displacement member 112 moves upward due to the elastic force of the plate spring. As a result, a clearance is formed between the displacement member 112 and the shaft-rotation synchronizing member 113. On the other hand, when electric power is supplied to the exciting member 110 (i.e., in energized state), the displacement member 112 moves downward and, as a result, the lower surface of the displacement member 112 is firmly brought into contact with the upper surface of the shaft-rotation synchronizing member 113. Thus, the displacement member 112 and the shaft-rotation synchronizing member 113 can rotate synchronously. Accordingly, if the displacement member 112 rotates in accordance with the rotation of the traveling motor 42 when the traveling system clutch 92 is in the engaged state, the traveling system power transmission shaft 82 and the shaft-rotation synchronizing member 113 rotate together in synchronization with the displacement member 112.

Similar to the steering system clutch 94, the traveling system clutch 92 can switch its operational state between an engaged state (i.e., ON) and a disengaged state (i.e., OFF) according to a control signal input from the controller 38 (see FIG. 1). In a case where the traveling system clutch 92 is in the engaged state, the power of the rotary shaft 106 can be transmitted to the traveling system power transmission shaft 82. In a case where the traveling system clutch 92 is in the disengaged state, the power of the rotary shaft 106 cannot be transmitted to the traveling system power transmission shaft 82. To this end, the traveling system clutch 92 and the controller 38 are connected via the cable 116.

As illustrated in FIG. 7, an upper side rotary shaft 118 is rotatable around a horizontally extending axis and is supported at the inside of the upper portion of the rotatable housing 76. The traveling system power transmission shaft 82 has a lower end portion connected via a bevel gear mechanism to one end portion (i.e., the left end portion illustrated in FIG. 7) of the upper side rotary shaft 118, so that the power can be transmitted from the traveling system power transmission shaft 82 to the upper side rotary shaft 118. The traveling system gear mechanism 86, which is provided inside the rotatable housing 76, can transmit the rotation of the upper side rotary shaft 118 to the axle 90. According to the illustrated example, the traveling system gear mechanism 86 includes a plurality of spur gears.

The traveling system power transmission shaft 82 extends thoroughly inside the steering shaft 78 and is rotatably supported by the steering shaft 78. Further, the rotary shaft 106 of the traveling motor 42, the rotary member 120 that can rotate synchronously with the rotary shaft 106, the traveling system clutch 92, the traveling system power transmission shaft 82, the traveling system gear mechanism 86, and the axle 90 cooperatively constitute a traveling system power transmission path. According to this configuration, the traveling system clutch 92 provided in the traveling system power transmission path can selectively transmit the power between the traveling motor 42 and the axle 90. Further, the traveling system clutch 92 can prevent the rotational force of the axle 90 from being transmitted to the traveling motor 42 in a state where no electric power is supplied to the traveling motor 42, namely in a state where the driving operation of the traveling motor 42 is stopped.

Further, the steering angle sensor 88 capable of detecting the steering angle of the steering shaft 78 is provided on the caster wheel support units 54 and 56. The steering angle sensor 88 includes a sensor shaft 122 that is elongated in the vertical direction (i.e., in parallel with the steering shaft 78) and is rotatably supported by the lower side member 104, a gear mechanism 124 for the sensor that is provided between the sensor shaft 122 and the steering shaft 78, and a detection unit 126 that is provided on the lower end side of the sensor shaft 122. The gear mechanism 124 for the sensor includes a shaft side gear 128 and a sensor side gear 130 meshing with each other. The shaft side gear 128 is a spur gear fixed to the upper portion of the steering shaft 78, and the sensor side gear 130 is a spur gear fixed to the upper portion of the sensor shaft 122.

The sensor shaft 122 has a lower end portion inserted in the detection unit 126, which is configured to detect a steering angle of the sensor shaft 122 that represents an angular deviation from a reference position and also detect a rotational direction of the sensor shaft 122. The steering angle sensor 88 can generate a steering angle signal (e.g., +α or −α, in which plus and minus indicate rotational directions) that represents the angular deviation and the rotational direction of the steering shaft 78 relative to the reference position of the steering shaft 78 (that corresponds to the straight forward direction). The detected steering angle signal is sent via the cable 116 to the controller 38 (see FIG. 1). The steering angle sensor 88 is disposed on the downstream side of the steering system clutch 94 in the power transmission direction of the steering system power transmission path.

Alternatively, the steering angle sensor 88 can be configured to include a unit to be sensed that is provided on the steering shaft 78 and disposed on the downstream side of the steering system clutch 94 in the power transmission direction of the steering system power transmission path, or provided on another shaft disposed coaxially with the steering shaft 78 and connected to the steering shaft 78, and a detection unit provided at a position confronting with the unit to be sensed. Further, the steering angle sensor 88 can be configured to detect a steering angle of the portion connected to the steering shaft 78.

In the present embodiment, the shaft side gear 128 and the sensor side gear 130 are the same in the number of teeth. Therefore, the gear mechanism 124 for the sensor transmits the rotation of the steering shaft 78 to the sensor shaft 122 at a rotational speed identical to that of the steering shaft 78. Alternatively, the number of teeth of the sensor side gear 130 can be set to be greater than that of the shaft side gear 128. In this case, the gear mechanism 124 for the sensor transmits the rotation of the steering shaft 78 to the sensor shaft 122 at a rotational speed slower than that of the steering shaft 78. In this case, the rotational angle of the steering shaft 78 is different from the rotational angle of the sensor shaft 122. The steering angle of the steering shaft 78 can be calculated based on a one-to-one relationship when the rotational angle of the sensor shaft 122 is detected. On the other hand, if the number of teeth of the sensor side gear 130 is set to be smaller than that of the shaft side gear 128, the steering shaft 78 may cause a phase change of 2 when the sensor shaft 122 keeps 1 phase. Therefore, it may be difficult to accurately detect the steering angle of the steering shaft 78.

The caster wheel support units 54 and 56, each having the above described constituent components, are the same parts that are supported by the left and right end portions of the swing arm 16 (see FIG. 1). Further, as illustrated in FIG. 4 and FIG. 6, the caster wheel support units 54 and 56 include a pair of first flat portions 134 and a pair of second flat portions 138. The first flat portions 134 are positioned on parallel virtual planes or the same virtual plane and are directed in the downward direction with respect to the lower side member 104, so as to serve as reference planes that can abut against a flat portion 132 (see FIG. 4) on the upper surface of the right and left end portions of the swing arm 16. The second flat portions 138 are parallel to each other and are directed in the back-and-forth direction (i.e., the right-and-left direction in FIG. 4 and FIG. 6) with respect to the lower side member 104, so as to serve as reference planes that can abut against a front flat portion 136 (see FIG. 4) of the right and left end portions of the swing arm 16. The length of the lower side member 104 in the back-and-forth direction, at its upper end portion, is longer than that of the tube-like portion 102. The above described first flat portions 134 are provided on the lower surface of the upper end portion.

Further, the second flat portions 138 are provided on an outer circumferential surface, which is directed to the back-and-forth direction, of the tube-like portion 102 that is located at the lower end portion of the lower side member 104. Two caster wheel support units 54 and 56 have mutually different orientations in the back-and-forth direction, and the traveling motors 42 and 44 are disposed on the outer side of the steering motors 46 and 48. The stationary housing 74 is firmly fixed to the swing arm 16 by means of bolts or the like in a state where the first flat portions 134 and the second flat portions 138 are brought into contact with the flat portions 132 and 136 on the upper surface and the front surface of the swing arm 16.

The caster wheels 18 and 20 are freely rotatable (i.e., freely steerable) more than 360 degrees around the steering shaft 78 in a state where the steering system clutch 94 is in the disengaged state. The caster wheels 18 and 20 can be forcibly steered by the steering motors 46 and 48 in a state where the steering system clutch 94 is in the engaged state. Further, the caster wheels 18 and 20 are freely rotatable (i.e., freely travelable) around the axle 90 (see FIG. 7) in a state where the traveling system clutch 92 is in the disengaged state. The caster wheels 18 and 20 can be forcibly steered by the traveling motors 42 and 44 in a state where the traveling system clutch 92 is in the engaged state. In other words, the steering system clutch 94 can select free steering or forced steering for the caster wheels 18 and 20. The traveling system clutch 92 can select free traveling or forced traveling for the caster wheels 18 and 20.

According to the above described configuration, the swing arm 16 is swingable around the horizontal shaft extending in the back-and-forth direction and the caster wheels 18 and 20 are supported by the swing arm 16. Therefore, in a state where the ground surface is in bad condition (for example, when the ground surface is an undulated or inclined surface), the degree of being parallel, i.e., the degree of inclination, relative to the horizontal direction can be changed for each of the axle of the left and right wheels 14 and 15 and the axle 90 (see FIG. 7) of the caster wheels 18 and 20. Therefore, the caster wheels 18 and 20 can firmly grip the ground while they rotate. As a result, the driving power of the caster wheels 18 and 20 and the wheels 14 and 15 can be effectively transmitted to the ground.

FIG. 10 illustrates a fundamental configuration of the lawnmower vehicle 10 that includes the controller 38. The controller 38, for example, includes an electronic control unit (ECU) 140 that is a control circuit unit including a CPU, first driving circuits (i.e., two motor drivers although not illustrated) that can drive the wheel driving motors 34 and 36 dedicated to the left and right wheels 14 and 15 illustrated in FIG. 11, second driving circuits (i.e., two motor drivers) 142 and 144 that can drive the traveling motors 42 and 44 dedicated to the left and right caster wheels 18 and 20, a third driving circuit (i.e., two motor drivers) 146 and 148 that can drive the steering motors 46 and 48 dedicated to the left and right caster wheels 18 and 20, and a plurality of power regeneration units (not illustrated) that correspond to the wheel driving motors 34 and 36 and the traveling motors 42 and 44.

For example, the first driving circuits drive the wheel driving motors 34 and 36 according to a control signal supplied from the ECU 140. The wheel driving motors 34 and 36 return, to the controller 38, feedback signals representing rotational speed, rotational direction, and current values. Further, electrically operable braking units (not illustrated) are provided to decelerate the wheels 14 and 15 (see FIG. 11) associated with the wheel driving motors 34 and 36. When the brake pedal 32 (see FIG. 1) is operated, the braking units receive a control signal from the controller 38 and generate the braking force in accordance with the received control signal.

Further, the ECU 140 supplies control signals to the traveling system clutch 92 and the steering system clutch 94 to control connection/disconnection of respective clutches. The ECU 140 further supplies control signals to the lawnmower 22 to control operations to be performed by the lawnmower 22. The batteries 50 and 51 supply electric power to the lawnmower 22, the clutches 92 and 94, and the motors 34, 36, 42, 44, 46, and 48.

A forward movement pedal sensor 150 can detect a depression amount (i.e., an operation amount) of the forward movement accelerator pedal 28 (see FIG. 1). A rearward movement pedal sensor 152 can detect a depression amount (i.e., an operation amount) of the rearward movement accelerator pedal 30 (see FIG. 1). The ECU 140 acquirers detection signals sent from respective pedal sensors 150 and 152. The ECU 140 further acquirers detection signals from left and right steering angle sensors 88 associated with the left and right caster wheels 18 and 20 as well as a detection signal representing an operation amount, i.e., a steering position detection value, from the steering operator 26 (see FIG. 1).

In FIG. 10, the solid line is a communication line of the CANbus network (i.e., one of the on-vehicle networks) that connects the ECU 140 to various components, the bold dotted line is a signal line that transmits a detection signal from each sensor to the ECU 140, and the thin dotted line is a power line that supplies electric power to each component from the batteries 50 and 51. More specifically, the driving circuits 142, 144, 146, and 148 of respective motors 34, 36, 42, 44, 46, and 48, the clutches 92 and 94, the lawnmower 22, and the ECU 140 are mutually connected via a single wiring that enables multiplex communication of signals among a plurality of components. If desirable, the communication line of the CANbus network can be used to connect only the driving circuits 142, 144, 146, and 148 of respective motors 34, 36, 42, 44, 46, and 48 and the ECU 140. Further, respective sensors 88, 150, 152, and 154 can be connected via the communication line of the CANbus network. Moreover, the communication line of another on-vehicle network (e.g., FlexRay network) can also be used to connect the above-described components.

Further, the wheel driving motors 34 and 36 can function as electric generators in a phase where the left and right wheels 14 and 15 (see FIG. 11) are decelerated. The generated electric power can be supplied via the power regeneration unit to the batteries 50 and 51 (i.e., the power source units) for charging. The first driving circuits capable of driving the wheel driving motors 34 and 36 and the power regeneration units can be combined as an integrated inverter circuit. Further, the traveling motors 42 and 44 capable of driving the caster wheels 18 and 20 (see FIG. 11) are similar to the wheel driving motors 34 and 36 in the above described functions. The power regeneration units corresponding to the traveling motors 42 and 44 are similar to the power regeneration units corresponding to the wheel driving motors 34 and 36.

The batteries 50 and 51 are secondary batteries that can store electric energy and can supply electric power, if necessary, to respective electric loads such as the wheel driving motors 34 and 36 (see FIG. 11) and the traveling motors 42 and 44. The secondary batteries 50 and 51 are, for example, lead storage batteries, lithium-ion rechargeable assembled cells, or nickel metal hydride assembled cells.

The batteries 50 and 51 can be configured to receive charging power from an external power source according to a plug-in method or other method. In this case, the batteries 50 and 51 can be sufficiently charged by the external power source when the lawnmower vehicle 10 is in a non-operative state. Further, in a case where the lawnmower vehicle 10 is a hybrid lawnmower vehicle that includes an engine in addition to the batteries 50 and 51, the batteries 50 and 51 can be charged by the external power source.

A mower motor (not illustrated) is an electric motor capable of driving the lawnmower 22 and is, for example, connected to the batteries 50 and 51 to rotate a lawnmower blade (or lawnmower blades) of the lawnmower 22. A lawnmower starter switch (not illustrated) is provided in the vicinity of the driver's seat 24 (see FIG. 1) to enable a worker to ON/OFF control the mower motor. More specifically, the ECU 140 detects an ON/OFF state of the lawnmower starter switch and controls a driver of the mower motor according to the detected state to cause the mower motor to start or stop its operation, thereby activating or deactivating the lawnmower 22.

In the present embodiment, the ECU 140 controls operations to be performed by the wheel driving motors 34 and 36 connected to the left and right wheels 14 and 15 (see FIG. 11) according to the operation amount of the steering operator 26 and the depression amount of respective accelerator pedals 28 and 30. Further, in a case where the steering system clutch 94 is in the engaged state, the ECU 140 controls operations to be performed by the steering motors 46 and 48 in addition to the control for the wheel driving motors 34 and 36. In a case where the traveling system clutch 92 is in the engaged state, the ECU 140 controls operations to be performed by the traveling motors 42 and 44 in addition to the control for the wheel driving motors 34 and 36.

Further, in a case where the clutches 92 and 94 are in the disengaged state, the ECU 140 controls operations to be performed by the wheel driving motors 34 and 36 connected to the left and right wheels 14 and 15 according to the operation amount of the steering operator 26 and the depression amount of respective accelerator pedals 28 and 30. The ECU 140 sets an average speed for the rotational speeds of the left and right wheel driving motors 34 and 36 according to the depression amount of respective accelerator pedals 28 and 30. The ECU 140 further sets a speed difference between the left and right wheel driving motors 34 and 36 according to the operation amount of the steering operator 26. The ECU 140 can further set a speed ratio between the left and right wheel driving motors 34 and 36 according to the operation amount of the steering operator 26.

For example, in a state where the steering operator 26 is held in a neutral position indicating the straight forward direction, if the forward movement accelerator pedal 28 is depressed, the ECU 140 performs control for rotating the wheels 14 and 15 (see FIG. 11) in the forward direction. As the depression amount increases, the rotational speeds of respective wheels 14 and 15 increase and the forward movement speed shifts to the high-speed side. On the other hand, if the rearward movement accelerator pedal 30 is depressed, the ECU 140 performs control for rotating the wheels 14 and 15 in the rearward direction.

As the depression amount increases, the rotational speeds of respective wheels 14 and 15 increase and the rearward movement speed shifts to the high-speed side. In this manner, the ECU 140 can control the lawnmower vehicle 10 to move at an arbitrary speed in the forward or rearward direction.

Further, in a state where the forward movement accelerator pedal 28 is held at an appropriate depression amount, if the steering operator 26 is rotated in the clockwise direction, the ECU 140 sets the rotational speed of the left wheel 14 (see FIG. 11) to be faster than the rotational speed of the right wheel 15 (see FIG. 11) so that the lawnmower vehicle 10 can turn to the right while traveling. If the rotational amount of the steering operator 26 becomes larger, the ECU 140 increases the difference between the rotational speed of the left wheel 14 and the rotational speed of the right wheel 15 correspondingly. On the other hand, if the rotational amount of the steering operator 26 becomes smaller, the ECU 140 decreases the difference between the rotational speed of the left wheel 14 and the rotational speed of the right wheel 15 correspondingly. In this manner, the ECU 140 can adjust the turning radius of the vehicle. If the steering operator 26 is rotated in the counterclockwise direction, the ECU 140 sets the rotational speed of the right wheel 15 to be greater than the rotational speed of the left wheel 14 so that the lawnmower vehicle 10 can turn to the left while traveling.

Further, if the depression amount of the forward movement accelerator pedal 28 is changed while the vehicle is traveling, the vehicle can turn while changing the traveling speed. If the steering operator 26 is operated in a state where the rearward movement accelerator pedal 30 is depressed, the vehicle can turn while traveling in the rearward direction.

As described above, the ECU 140 can independently adjust the rotational speeds of the left and right wheel driving motors 34 and 36 according to a rotational operation of the steering operator 26 and depressing operations of the accelerator pedals 28 and 30, so as to control the traveling and turning of the vehicle. Further, if the steering system clutch 94 is in the disengaged state, the caster wheels 18 and 20 are freely rotatable around the steering shaft 78. In this case, the steering angle is determined according to the traveling of the left and right wheels 14 and 15 that reflect the driving operations of respective wheel driving motors 34 and 36.

Further, if the right and left steering system clutches 94 are in the engaged state, the controller 38 can forcibly adjust the steering angles of respective caster wheels 18 and 20 to arbitrary angles. For example, in a state where the steering system clutch 94 is disconnected, the steering angles of the caster wheels 18 and 20 may become inappropriate if the ground surface is inclined or undulated. In such a case, an appropriate steering angle detection unit can be used to monitor the steering angle. If the steering angle is greatly deviated from an appropriate value, the ECU 140 can bring each steering system clutch 94 into the engaged state and supply control signals to the third driving circuits 146 and 148 that drive the steering motors 46 and 48 to accurately control the steering angles of respective caster wheels 18 and 20 to appropriate angles.

In this case, each steering system clutch 94 can be disconnected again after the steering angles are adjusted to the appropriate angles. According to the above described configuration, it is required to monitor the steering angles of the caster wheels 18 and 20. Therefore, the ECU 140 performs control for engaging or disengaging the steering system clutch 94 according to a detection value of each steering angle sensor 88.

The ECU 140 includes a control logic circuit, such as a CPU, which is capable of processing an input detection signal that represents an operational state of the lawnmower vehicle 10 and also generating a control signal to be supplied to each constituent component. The ECU 140 further includes a memory.

The control to be performed for the wheel driving motors 34 and 36 and the steering motors 46 and 48 is basically the rotational speed control for adjusting the traveling speed to a target value. In particular, when the vehicle is turning, the speed difference between the left and right wheels 14 and 15 corresponding to the turning center position can be instructed based on an operation amount signal representing a steering amount of the steering operator 26. The mean traveling speed, i.e., the speed relative to the ground at exactly the midpoint between the left and right wheels 14 and 15 on the axle of the left and right wheels 14 and 15, can be instructed based on an operation amount signal representing the depression amount of respective accelerator pedals 28 and 30. Therefore, the ECU 140 controls a target rotational speed or a target rotational angle for each of respective motors 34, 36, 46, and 48 so that these motors can be integrally controlled in association with each other.

It may be useful to obtain, beforehand, a relationship between the operation amount signal representing the depression amount of respective accelerator pedals 28 and 30 and the mean traveling speed, and a relationship between the operation amount signal representing the steering position and the speed difference or the speed ratio between the left and right wheels 14 and 15. The obtained relationships data can be stored, for example, in a memory unit 158 (see FIG. 11) in the controller 38. When the vehicle is traveling straight, the ECU 140 can perform control for adjusting the output torque to a target value. For example, the vector control is available to control the torque.

Next, a turning function of the lawnmower vehicle 10 is described below. In the following description, components similar to those illustrated in FIG. 1 to FIG. 10 are denoted by the same reference numerals and detailed descriptions for these components are not repeated. In FIG. 11, a portion that corresponds to the controller 38 illustrated in FIG. 10 is a control unit 156 and the memory unit 158. In the control unit 156, a turning driver module 168 corresponds to a portion of the controller 38 that includes the driving circuits for respective motors 34, 36, 42, 44, 46, and 48 (see FIG. 10 regarding 46 and 48) that drive the wheels 14 and 15 and the caster wheels 18 and 20. The remaining portion of the control unit 156 and the memory unit 158 connected to the control unit 156 correspond to another portion of the controller 38 that includes the control logic circuit.

As illustrated in FIG. 11, the wheel driving motors 34 and 36 ($M_{DR}$, $M_{DL}$) are connected to the wheels 14 and 15 and the traveling motors 42 and 44 ($M_{SR}$, $M_{SL}$) are connected to the caster wheels 18 and 20. The control unit 156 receives an operation amount signal from the steering operator 26 that represents a steering amount of the steering operator 26. The control unit 156 further receives an operation amount signal from respective accelerator pedals 28 and 30 that represents the depression amount of respective accelerator pedals 28 and 30. The control unit 156 supplies driving signals to the wheel driving motors 34 and 36, the traveling motors 42 and 44, and the steering motors 46 and 48, respectively.

The control unit 156 can generate the driving signals to be supplied to the wheel driving motors 34 and 36, the traveling motors 42 and 44, and the steering motors 46 and 48, respectively, based on the operation amount signals received from the steering operator 26 and the accelerator pedals 28 and 30. The control unit 156 is capable of causing the wheels 14 and 15 and the caster wheels 18 and 20 to turn around their turning center positions corresponding to a turning instruction.

The control unit 156 includes a mean traveling speed acquisition module 160, a turning center position acquisition module 162, a left and right wheel speed acquisition module 164, a caster wheel speed acquisition module 166, and the turning driver module 168. The mean traveling speed acquisition module 160 can acquire a mean traveling speed corresponding to the operation amount signal of respective accelerator pedals 28 and 30. The turning center position acquisition module 162 can determine and acquire a turning center position based on the mean traveling speed and an acquired turning instruction input, which is a speed difference between the left and right wheels 14 and 15 according to the operation amount of the steering operator 26.

The left and right wheel speed acquisition module 164 can determine and acquire traveling speeds of the left and right wheels 14 and 15 based on the turning center position. The caster wheel speed acquisition module 166 can determine and acquire traveling speeds of the caster wheels 18 and 20 based on the turning center position and the traveling of the left and right wheels 14 and 15. The turning driver module 168 can generate control signals to be supplied to the motors 34 and 36 and the like dedicated to the wheels 14 and 15 and the caster wheels 18 and 20 based on the traveling speeds of the left and right wheels 14 and 15 and the traveling speeds of the caster wheels 18 and 20. The wheels 14 and 15 and the caster wheels 18 and 20 can turn around the turning center position based on the control signals supplied from the turning driver module 168.

A computer mounted on the vehicle can implement processing for realizing each of the above described various mechanisms, except for a driver portion of the turning driver module 168. Software programs, such as a lawnmower control program, installed on the computer can execute each of the above described functions. As a modified embodiment, an appropriate hardware configuration may be additionally employed to partly realize the above described functions.

The lawnmower control program is, for example, stored in the memory unit 158 connected to the control unit 156. Various functions to be realized by the control unit 156 are described below in detail. Prior to the description for these functions, linear traveling and turn traveling are described below with reference to FIG. 12, FIG. 13A, FIG. 13B, and FIG. 13C. The reference numerals illustrated in FIG. 1 to FIG. 11 are similarly used in the following description. These drawings include plan views schematically illustrating various traveling states of the lawnmower vehicle 10 that includes two main wheels 14 and 15 and two caster wheels 18 and 20. In the present embodiment, all of the wheels 14 and 15 and the caster wheels 18 and 20 are independently driven for traveling.

FIG. 12 illustrates an example of linear traveling in which all of the wheels 14 and 15 and the caster wheels 18 and 20 travel straight. Therefore, in this case, the wheels 14 and 15 and the caster wheels 18 and 20 have the same traveling speed. In the context of the present disclosure, the term "traveling speed" refers to a horizontal moving speed of each wheel relative to the ground. If there is a difference between the diameter of the wheels 14 and 15 and the diameter of the caster wheels 18 and 20, the rotational speed of the wheels 14 and 15 differs from the rotational speed of the caster wheels 18 and 20 even when the wheels 14 and 15 and the caster wheels 18 and 20 have the same traveling speed.

FIG. 13A, FIG. 13B, and FIG. 13C illustrate examples of turn traveling. FIG. 13A illustrates an example of turn traveling in which a turning center position 170 is on an extension of the axle of the wheels 14 and 15 and is offset radially inward relative to the inside wheel 14. FIG. 13B illustrates another example of turn traveling, which is generally referred to as a "pivot turn", according to which the turning center position 170 is at a ground-contact position of either one of the wheels 14 and 15 (i.e., the inside wheel 14 according to the illustrated example). FIG. 13C illustrates yet another example of turn traveling, which is generally referred to as a "zero turn" or a "spin turn", according to which the turning center position 170 is exactly at the midpoint between the wheels 14 and 15 on the axle of wheels 14 and 15. In this case, the traveling speeds of the wheels 14 and 15 are the same in absolute value. However, the direction of the rotation of the wheel 14 positioned on one side and the direction of the rotation of the wheel 15 positioned on the other side are opposed to each other. Therefore, the lawnmower vehicle 10 rotates around the turning center position 170 while the caster wheels 18 and 20 move along a circular line.

FIG. 13A, FIG. 13B, and FIG. 13C illustrate typical examples of turn traveling. Although not illustrated, there are other examples of turn traveling whose patterns are between these typical examples. For example, the turning center position may be somewhere inside between the wheels 14 and 15 on the axle of the wheels 14 and 15, although the turning center position is not at exactly the midpoint between the wheels 14 and 15. The turning center position may be closer to one of the wheels 14 and 15. In any of these cases, the wheels 14 and 15 and the caster wheels 18 and 20 turn around the turning center position without changing the planar layout relationship in the lawnmower vehicle 10.

Next, various functions to be realized by the system configuration illustrated in FIG. 11 are described below. The control unit 156 starts executing the lawnmower control program upon startup of the lawnmower vehicle 10 that a worker can manipulate with the steering operator 26. The control unit 156 receives a turning instruction input from the steering operator 26 if it is operated. More specifically, the control unit 156 receives, as the turning instruction input signals, an operation amount signal from the steering operator 26 that represents the steering amount and an operation amount signal from the accelerator pedals 28 and 30 that represents the depression amount.

When the steering position deviates from the neutral position in the clockwise direction, the control unit 156 generates an instruction that sets the rotational speed of the left wheel 14 to be higher than the rotational speed of the right wheel 15. Further, when the steering position deviates from the neutral position in the counterclockwise direction, the control unit 156 generates an instruction that sets the rotational speed of the right wheel 15 to be higher than the rotational speed of the left wheel 14. If the deviation of the steering position relative to the neutral position is increased, the control unit 156 generates an instruction that increases the rotational speed difference between the left wheel 14 and the right wheel 15.

Further, if the depression amount of the accelerator pedals 28 and 30 is increased, the control unit 156 generates an instruction that increases the traveling speed. If the depression amount of the accelerator pedals 28 and 30 is decreased, the control unit 156 generates an instruction that decreases the traveling speed. Accordingly, the control unit 156 can instruct a mean traveling speed based on the operation amount signal representing the depression amount, which is received from the accelerator pedals 28 and 30. Further, the control unit 156 can instruct a speed difference between the left and right wheels 14 and 15, which corresponds to a turning center position, based on the operation amount signal representing the steering position.

As described above, in the lawnmower vehicle 10 equipped with the steering operator 26, the mean traveling speed and the speed difference between the left and right wheels 14 and 15 are acquired as the turning instruction input. In the present embodiment, the steering operator 26 is not limited to the above described steering wheel and can be two-lever type swingable operators that are disposed on the right and left sides of the driver's seat 24. In this case, the traveling speeds of the left and right wheels 14 and 15 can be increased or decreased by changing the inclination angle of a corresponding lever. For example, a worker can push either one of the two levers forward to instruct the forward movement of the wheel positioned on the same side and can pull either one of the two levers rearward to instruct the rearward movement of the wheel positioned on the same side. When the lawnmower vehicle 10 is equipped with the two-lever type operator, the control unit 156 can acquire the traveling speeds of the left and right wheels 14 and 15, as turning instruction input signals, based on the operation amounts of respective levers that constitute the two-lever type operator.

Next, the control unit 156 determines and acquires the turning center position based on the acquired turning instruction input. Then, the control unit 156 determines and acquires the traveling speeds of the left and right wheels 14 and 15. The turning center position acquisition module 162 and the left and right wheel speed acquisition module 164 can implement the above described function to be realized by the control unit 156.

More specifically, turning center position acquisition module 162 acquires the turning center position using the method illustrated in FIG. 14A and FIG. 14B. FIG. 14A is a view that corresponds to FIG. 13A. FIG. 14A illustrates the layout of the wheels 14 and 15 and the turning center position 170 to be determined. In FIG. 14A, Vo represents the speed of the outside wheel 15 (i.e., the wheel positioned on the outside when the vehicle is turning) relative to the ground, and Vi represents the speed of the inside wheel 14 (i.e., the wheel positioned on the inside when the vehicle is turning) relative to the ground. Further, $V_M$ represents the speed of the vehicle relative to the ground at exactly the midpoint between the left and right wheels 14 and 15 on the axle of the left and right wheels 14 and 15. The speed $V_M$ corresponds to the mean traveling speed, which can be defined using the formula $V_M = (Vo+Vi)/2$. The turning center position acquisition module 162 can execute the processing for determining and acquiring the mean traveling speed. However, there may be a case in which only this portion in particular is executed and utilized. Therefore, in FIG. 11, the mean traveling speed acquisition module 160 is illustrated as an independent function of the control unit 156.

Further, 2T represents a main driving wheel tread, which is equal to the clearance between the wheels 14 and 15, and $r_r$ represents the radius of respective wheels 14 and 15. Accordingly, a rotational speed No of the outside wheel 15 around the axle thereof can be defined using the formula $(60Vo)/(2\pi r_r)$, and a rotational speed Ni of the inside wheel 14 around the axle thereof can be defined using the formula $(60Vi)/(2\pi r_r)$.

FIG. 14B illustrates example processes for calculations in determining the turning center position 170 using the above described symbols. In this case, it is assumed that the turning center position 170 is represented by a distance R from exactly the midpoint between the wheels 14 and 15 on the axle of the wheels 14 and 15. As illustrated in FIG. 14B, the turning center position can be defined using the formula $R = T \times \{(No+Ni)/(No-Ni)\}$. Accordingly, if T is given according to the configuration of the lawnmower vehicle 10, the turning center position R can be determined based on a mean rotational speed $N_M = (No+Ni)/2$ that corresponds to the mean traveling speed $V_M$ based on the depression amount of respective accelerator pedals 28 and 30 and also based on a rotational speed difference $\Delta = (No-Ni)$ that corresponds to a speed difference based on the steering position.

Further, rotational speeds No and Ni that correspond to the traveling speeds of the outside wheel 15 and the inside wheel 14 can be obtained based on the turning center position R, the mean rotational speed $N_M = (No+Ni)/2$, and the rotational speed difference $\Delta = (No-Ni)$ that corresponds to the speed difference. Further, the corresponding traveling speeds Vo and Vi of the wheels 15 and 14 can be determined based on the obtained rotational speeds No and Ni.

Next, the caster wheel speed acquisition module 166 of the control unit 156 determines and acquires the traveling speeds of the caster wheels 18 and 20 based on the traveling speeds of the left and right wheels 14 and 15 and the turning center position.

FIG. 15A, FIG. 15B, and FIG. 16 are views describing example processes for determining the traveling speeds of the caster wheels 18 and 20 using the turning center position R obtained in FIG. 14A and FIG. 14B. The reference numerals illustrated in FIG. 11, FIG. 14A, and FIG. 14B are similarly used in the following description. FIG. 15A is a view that corresponds to FIG. 13A, FIG. 14A, and FIG. 14B. FIG. 15A illustrates the layout of the wheels 14 and 15, the layout of the caster wheels 18 and 20, and the turning center position 170. In FIG. 15A, $V_{Fi}$ and $V_{Fo}$ are traveling speeds of the caster wheels 18 and 20 to be obtained. More specifically, $V_{Fo}$ represents the speed of the caster wheel 20 (i.e., the caster wheel positioned on the outside when seen from the turning center position 170) relative to the ground. $V_{Fi}$ represents the speed of the caster wheel 18 (i.e., the caster wheel positioned on the inside when seen from the turning center position 170) relative to the ground.

Further, 2t represents a caster wheel tread that is the clearance between the caster wheels 18 and 20, W represents a wheel base length that is the distance between the midpoint between the wheels 14 and 15 and the midpoint between the caster wheels 18 and 20, and $r_f$ represents the radius of the caster wheels 18 and 20. Accordingly, when the vehicle is turning, a rotational speed $N_{Fo}$ of the outside caster wheel 20 around the axle can be defined using the formula $(60V_{Fo})/(2\pi r_f)$ and a rotational speed $N_{Fi}$ of the inside caster wheel 18 around the axle can be defined using the formula $(60V_{Fi})/(2\pi r_f)$.

The caster wheels 18 and 20 can be brought, for example, into a freely rotatable state around the steering shaft 78, so that the steering angle of respective caster wheels 18 and 20 can follow the traveling direction of the wheels 14 and 15. Alternatively, the caster wheels 18 and 20 can be driven by the steering motors 46 and 48 so that the steering angle of respective caster wheels 18 and 20 can be forcibly adjusted to the following predetermined angles. The controller 38 disengages the steering system clutch 94 to bring the caster wheels 18 and 20 into a freely rotatable state around the steering shaft 78 only when the caster wheels 18 and 20 are not driven by the traveling motors 42 and 44, i.e., in a case where the traveling system clutch 92 is in the disengaged state. In other words, in a case where the traveling system clutch 92 is in the engaged state, the controller 38 controls the steering system clutch 94 to be constantly engaged so that the caster wheels 18 and 20 can be forcibly steered.

FIG. 15A illustrates a steering angle Gi of the inside caster wheel 18 and a steering angle Go of the outside caster wheel 20. Further, in FIG. 15A, Ri represents the distance between a ground-contact position of the inside caster wheel 18 and the turning center position 170, and Ro represents the distance between a ground-contact position of the outside caster wheel 20 and the turning center position 170.

FIG. 15B illustrates example processes for calculations in determining the steering angles $\theta_i$ and $\theta_o$ of respective caster wheels 18 and 20 using the above described symbols. In this case, the control unit 156 determines the distances $R_i$ and $R_o$ that represent turning radii of respective caster wheels 18 and 20 based on R that is determined as described in FIG. 14A and FIG. 14B, the wheel base length W, and the distance t that is a half of the caster wheel tread. Then, the control unit 156 determines the steering angles $\theta_o$ and $\theta_i$ based on the relationship of the obtained values of $R_o$ and $R_i$ and the determined R. The radii $R_o$ and $R_i$ are the distance between the turning center position 170 and the ground-contact positions of respective caster wheels 18 and 20.

FIG. 16 illustrates example processes for calculations in determining the traveling speeds $V_{Fi}$ and $V_{Fo}$ of the caster wheels 18 and 20 that correspond to the mean traveling speed $V_M$ of the wheels 14 and 15. The control unit 156 can determine the traveling speed $V_{Fo}$ of the outside caster wheel 20 and its rotational speed $N_{Fo}$ as illustrated in FIG. 16, as R is already obtained as illustrated in FIG. 14A and FIGS. 14B and $R_o$ is already obtained as illustrated in FIG. 15B. Similarly, the control unit 156 can determine the traveling speed $V_{Fi}$ of the inside caster wheel 18 and its rotational speed $N_{Fi}$. Accordingly, the memory unit 158 can be used to store formulae and maps to be required in calculations beforehand in addition to detailed specifications of the vehicle. The control unit 156 can use the data stored beforehand in the memory unit 158 to facilitate the processes for determining and acquiring the turning center position and the traveling speeds of the wheels 14 and 15 and the caster wheels 18 and 20 in response to the turning instruction input.

Next, to cause the lawnmower vehicle 10 to turn, the turning driver module 168 of the control unit 156 performs driving control for the wheel driving motors 34 and 36 and the traveling motors 42 and 44 based on the wheel traveling speeds and the caster wheel traveling speeds, or based on the rotational speeds $N_i$ and $N_o$ of the wheels 14 and 15 and the rotational speeds $N_{Fi}$ and $N_{Fo}$ of the caster wheels 18 and 20. More specifically, the turning driver module 168 independently supplies the acquired wheel traveling speeds or the wheel rotational speeds $N_i$ and $N_o$ to the wheel driving motors 34 and 36. Further, the turning driver module 168 independently supplies the acquired caster wheel traveling speeds or the caster wheel rotational speeds $N_{Fi}$ and $N_{Fo}$ to the traveling motors 42 and 44. Thus, the turning driver module 168 integrally controls the wheels 14 and 15 and the caster wheels 18 and 20 while associating them with each other so that these wheels can independently rotate around their axles. As a result, the lawnmower vehicle 10 can turn around the turning center position 170 while traveling.

In the present embodiment, the traveling motors 42 and 44 can supply driving force to the caster wheels 18 and 20 while satisfying the conditions for the rotational speeds of the caster wheels 18 and 20 in a state where the traveling system clutch 92 is engaged. Accordingly, the lawnmower vehicle 10 can increase the entire torque and can turn smoothly without increasing the rotation of each wheel excessively, and accordingly, without damaging the planted lawn excessively. As described above, the caster wheels 18 and 20 can be supplied with the driving power so that the lawnmower vehicle 10 can increase the overall torque while causing the wheels to turn appropriately.

In the foregoing description, the control unit 156 determines the rotational speeds of the caster wheels 18 and 20 assuming that the turning center position 170 is on the outside of the wheels 14 and 15 as illustrated in FIG. 13A. Similarly, in the case of the pivot turn illustrated in FIG. 13B and in the case of the spin turn illustrated in FIG. 13C, the control unit 156 can determine the rotational speeds of the caster wheels 18 and 20 based on the vehicle traveling speed and the turning center position referring to the geometrical dimensions of the lawnmower vehicle 10, as described with reference to FIG. 14A and FIG. 14B to FIG. 16.

Further, the lawnmower vehicle 10 described in the foregoing description is a four-wheel drive vehicle having two wheels 14 and 15 and two caster wheels 18 and 20 that can be driven by the motors. However, even in a case where the lawnmower vehicle 10 is a three-wheel drive lawnmower vehicle having only one caster wheel, the control unit 156 can determine the rotational speed of the single caster wheel based on the vehicle traveling speed and the turning center position referring to the geometrical dimensions of the lawnmower vehicle 10, as described with reference to FIG. 14A and FIG. 14B to FIG. 16. Similarly, in a case where the number of the wheels 14 and 15 is other than 2, or in a case where the number of the caster wheels 18 and 20 is three or more, the control unit 156 can determine the rotational speeds of respective wheels 14 and 15 and respective caster wheels 18 and 20 based on the vehicle traveling speed and the turning center position referring to the geometrical dimensions of the lawnmower vehicle 10.

Further, in the foregoing description, the controller 38 engages the traveling system clutch 92 dedicated to the caster wheels 18 and 20 and causes the traveling motors 42 and 44 to drive the caster wheels 18 and 20. However, if the controller 38 determines that the driving power of the wheels 14 and 15 is sufficient for the lawnmower vehicle 10 to travel, the controller 38 can select a two-wheel driving mode. In this case, only when it is determined that the torque is insufficient, the driving power of the caster wheels 18 and 20 can be added. To detect the shortage of torque, it is useful to provide a gradient sensor (not illustrated), which can detect the gradient of the vehicle body, on the lawnmower vehicle 10. The controller 38 receives a detection signal from the gradient sensor. If the controller 38 determines that the gradient of the vehicle relative to the ground exceeds a predetermined threshold, the controller 38 can engage the traveling system clutch 92 and otherwise disengage the traveling system clutch 92.

In a case where a mechanism for constantly transmitting the driving force to the caster wheels 18 and 20 is employed, the driving force required for the wheels 14 and 15 can be reduced correspondingly. In this case, the motors to be mounted on the lawnmower vehicle 10 can be downsized as a whole. In a case where a mechanism for transmitting the driving force to the caster wheels 18 and 20 only when it is required, is employed, the electric power consumption of the lawnmower vehicle 10 can be reduced when the vehicle is traveling on a flat or similar ground that does not particularly require the torque.

Further, the controller 38 can engage the steering system clutch 94 dedicated to the caster wheels 18 and 20 and cause the steering motors 46 and 48 to forcibly rotate respective caster wheels 18 and 20 around the steering shaft 78 to set a desired steering angle. For example, the orientation of each caster wheel may be unexpectedly changed due to bad ground surface conditions. If such an unstable state is not controlled, desired traveling and turning of the lawnmower vehicle 10 cannot be attained. Therefore, the controller 38 monitors the steering angle based on a detection signal of the steering angle sensor 88 provided for respective caster wheels 18 and 20. For example, if the actual steering angle deviates greatly more than given range from a target steering angle (i.e., calculated steering angle) that can be determined as illustrated in FIG. 15A, FIG. 15B, and FIG. 16, the controller 38 can perform control for adjusting the actual steering angle to the target steering angle. Thus, the traveling and turning of the lawnmower vehicle 10 can be stabilized, regardless of actual ground surface conditions.

As one aspect, the controller 38 can automatically control engagement/disengagement of the traveling system clutch 92 and the steering system clutch 94 dedicated to the caster wheels 18 and 20 in accordance with an input signal that represents a vehicle state, as described above. As another aspect, an operation unit (e.g., a switch unit) can be provided in the vicinity of the driver's seat 24 to enable a worker to manually instruct the switching of engagement/disengagement for the traveling system clutch 92 and the steering system clutch 94. In this case, the controller 38 receives an instruction signal from the operation unit and supplies a control signal to a corresponding one of the traveling system clutch 92 and the steering system clutch 94. The designated clutch switches the engagement/disengagement state according to the control signal received from the controller 38.

Even when the steering system is configured to manually switch the engagement/disengagement of respective clutches 92 and 94, if in a situation where the traveling system clutch 92 is engaged to forcibly drive the caster wheels 18 and 20 for traveling, the controller 38 can constantly engage the steering system clutch 94 and control the engagement/disengagement of the steering system clutch 94 so that the steering angles of respective caster wheels 18 and 20 can be forcibly set to the target angles (i.e., calculated angles). The above described system configuration can effectively prevent the planted lawn from being damaged (or scuffed) by the caster wheels 18 and 20 that are driven forcibly when being unexpectedly steered when the vehicle is turning.

Furthermore, as a case other than the above described manual switching of clutch engagement/disengagement, the steering system may be configured to automatically switch the engagement/disengagement of respective clutches 92 and 94 if the actual steering angle deviates greatly more than given range from the target steering angle (i.e., calculated steering angle). Even in this case, in a situation where the traveling system clutch 92 is engaged to forcibly drive the caster wheels 18 and 20 for traveling, the controller 38 can constantly engage the steering system clutch 94 and control the engagement/disengagement of the steering system clutch 94 so that the steering angles of respective caster wheels 18 and 20 can be forcibly set to the target angles (i.e., calculated angles). Therefore, as described above, the planted lawn can be effectively prevented from being damaged by the caster wheels 18 and 20 that are driven forcibly when being unexpectedly steered when the vehicle is turning.

According to the above described riding work vehicle, the operational state of respective caster wheels 18 and 20 can be selected between free traveling and forced traveling by changing the engagement/disengagement of the traveling system clutch 92. Further, the operational state of respective caster wheels 18 and 20 can be selected between free steering and forced steering by changing the engagement/disengagement of the steering system clutch 94. Furthermore, the traveling system clutch 92 can prevent the rotational force of the axle 90 from being transmitted to the traveling motors 42 and 44 in a state where the traveling motors 42 and 44 are deactivated. The steering system clutch 94 can prevent the rotational force of the steering shaft 78 from being transmitted to the steering motors 46 and 48 in a state where the steering motors 46 and 48 are deactivated.

Therefore, in a state where the motors 42, 44, 46, and 48 dedicated to the caster wheels 18 and 20 are all deactivated, the corresponding clutches 92 and 94 are disengaged. Therefore, even in a case where there is a tendency for the force to be transmitted from the ground to the motors 42, 44, 46, and 48 via the axle 90 of the caster wheels 18 and 20 or via the steering shaft 78 when the vehicle is traveling, the above described system configuration can prevent the force from being transmitted to the motors 42, 44, 46, and 48. More specifically, when the caster wheels 18 and 20 are in the free traveling state or in the free steering state, the present embodiment can prevent the motors 42, 44, 46, and 48 from acting as resistance. Therefore, the axle 90 or the steering shaft 78 can rotate smoothly. In other words, the present embodiment can realize the configuration capable of effectively saving energy.

Further, the steering angle sensor 88 that can detect the steering angle of the steering shaft 78 is disposed on the downstream side of the steering system clutch 94 in the power transmission direction of the steering system power transmission path. Therefore, in the configuration in which the steering system clutch 94 is provided in the steering system power transmission path, the steering angle of the steering shaft 78 can be detected regardless of the engagement/disengagement of the steering system clutch 94.

Further, the sensor shaft 122 is disposed in parallel with the steering shaft 78. The gear mechanism 124 for the sensor is provided between the sensor shaft 122 and the steering shaft 78. The gear mechanism 124 can transmit the rotation of the steering shaft 78 to the sensor shaft 122 at a rotational speed identical to that of the steering shaft 78 or at a rotational speed slower than that of the steering shaft 78. Therefore, the present embodiment can prevent the mechanical configuration including the steering shaft 78 and the steering angle sensor 88 from being excessively enlarged. Therefore, a portion to be modified to detect the steering angle of the steering shaft 78 can be realized by a relatively simple, compared to the basic configuration. The number of the modified portion can be decreased. Further, a general conventional steering angle sensor can be used as the detection unit 126.

Further, the traveling system clutch 92 can switch its operation between the engaged state and the disengaged state according to a control signal supplied from the controller 38. Therefore, the controller 38 supplies a control signal to the traveling system clutch 92 to enable or disable power transmission between the traveling motors 42 and 44 and the caster wheels 18 and 20 according to an operation of a driver or according to a traveling state of the vehicle.

Accordingly, in a case where the traveling motors 42 and 44 are electric motors as described in the present embodiment, the traveling system clutch 92 is brought into the engaged state when the vehicle is in a decelerating state to realize regenerative braking by the caster wheels 18 and 20. In this case, the rotational force of respective caster wheels 18 and 20 can be transmitted to the traveling motors 42 and 44. The electric power generated by the traveling motors 42 and 44 can be used to charge the batteries 50 and 51. The lawnmower vehicle 10 can further save energy. The layout of the traveling system clutch 92 is not limited to the example illustrated in FIG. 8. For example, the traveling system clutch 92 can be disposed between an outer circumferential surface of the axle 90 of the caster wheels 18 and 20 and an inner circumferential surface of a lowermost spur gear that constitutes the traveling system gear mechanism 86 provided around the axle 90.

[Second Embodiment of the Present Invention]

Next, a second embodiment of the present invention is described below. A lawnmower vehicle that can serve as a riding work vehicle according to the present embodiment has a fundamental configuration similar to that of the lawnmower vehicle 10 according to the first embodiment described with reference to FIG. 1 to FIG. 16. In the following description, components similar to or corresponding to those illustrated in FIG. 1 to FIG. 16 are denoted by the same reference numerals. In the present embodiment, the traveling system clutch 92 is a one-way clutch or a two-way clutch, although it was described as an electromagnetic clutch in the first embodiment with reference to FIG. 8. Similarly, the steering system clutch 94 is a two-way clutch (i.e., not the electromagnetic clutch). These clutches 92 and 94 can be disposed at appropriate positions that are similar to or may be different from the positions described in the first embodiment.

However, it is desired that the steering system clutch 94 is provided on the upstream side of the steering angle sensor 88 in the power transmission direction of the steering system power transmission path, so that the steering angle sensor 88 can constantly detect the steering angle regardless of the engagement/disengagement of the steering system clutch 94. Further, the traveling system clutch 92 can be provided, for example, between the outer circumferential surface of the axle 90 of the caster wheels 18 and 20 and the inner circumferential surface of the lowermost spur gear that constitutes the traveling system gear mechanism 86 provided around the axle 90, as can be understood with reference to FIG. 7.

Further, as can be understood with reference to FIG. 7 and FIG. 8, in a case where the traveling system clutch 92 is a one-way clutch, the traveling system clutch 92 can disable power transmission from the axle 90 of the caster wheels 18 and 20 to the traveling motors 42 and 44 if the rotational speed of the traveling motors 42 and 44 becomes slower by a predetermined ratio with respect to the vehicle traveling speed, i.e., the rotational speed of the caster wheels 18 and 20, for example, when there is a tendency for the rotary shaft 106 of the traveling motors 42 and 44 to be slower than the traveling system power transmission shaft 82. Even in this case, the traveling system clutch 92 can prevent the rotational force of the axle 90 from being transmitted to the traveling motors 42 and 44 in a state where the traveling motors 42 and 44 are deactivated, in the same manner as in the above described first embodiment in which the electromagnetic clutch is used. Even in this configuration, the present embodiment can prevent the traveling motors 42 and 44 from acting as resistance for smooth traveling in a state where the traveling motors 42 and 44 are deactivated. Therefore, the vehicle can save energy.

The positional relationship between the steering shaft 78 and the axle 90 of the caster wheels 18 and 20 in the back-and-forth direction can be reversed according to the traveling direction of the vehicle (i.e., the forward movement or the rearward movement) when the caster wheels 18 and 20 are in the free steering state. For example, as understood from the example illustrated in FIG. 6, a caster trail 176 (i.e., an offset) represents the distance between a steering shaft center 172 and the axle center (i.e., a wheel center 174) in the back-and-forth direction (i.e., in the right-and-left direction in FIG. 6).

In this case, the steering angle tends to be determined according to the traveling state of the left and right wheels 14 and 15 when the steering shaft is freely rotatable. For example, when the vehicle is traveling forward, the wheel center 174 of respective caster wheels 18 and 20 is positioned on the rear side of the steering shaft center 172. When the vehicle is traveling rearward, the wheel center 174 is positioned on the front side of the steering shaft center 172. Accordingly, even when the traveling system clutch 92 is a one-way clutch, the traveling system clutch 92 can prevent the rotation of the caster wheels 18 and 20 from being transmitted to the traveling motors 42 and 44 in a state where the traveling motors 42 and 44 are deactivated regardless of the forward movement or the rearward movement of the vehicle and the wheels 14 and 15 are driven by the wheel driving motors 34 and 36. Therefore, this configuration can prevent the traveling motors 42 and 44 from acting as resistance for smooth traveling. However, in this case, compared to the above described first embodiment, the regenerative braking by the caster wheels 18 and 20 is not available and the power regeneration using the traveling motors 42 and 44 cannot be implemented.

On the other hand, as understood from FIG. 7 and FIG. 8, when the traveling system clutch 92 is a two-way clutch, the traveling system clutch 92 enables power transmission between the traveling motors 42 and 44 and the axle 90 only when there is a tendency for the power to be transmitted from the traveling motors 42 and 44 to the axle 90. Further, the traveling system clutch 92 disables the power transmission when there is the tendency for the power to be transmitted from the axle 90 to the traveling motors 42 and 44. Further, the two-way clutch can transmit the power from the traveling motors 42 and 44 to the axle 90 regardless of rotational direction of respective traveling motors 42 and 44.

Further, in a case where the traveling system clutch 92 is constituted by the two-way clutch, the controller 38 (i.e., the control unit) can supply electric power generated by the traveling motors 42 and 44 to the batteries 50 and 51 (which serve as the power source units and the electric power storage units) to charge the batteries 50 and 51, if it is determined that the regenerative braking request is present. For example, the controller 38 can determine the presence of the regenerative braking request if a sensor detects that the accelerator pedals 28 and 30 are off, i.e., the depression amount is 0, when the vehicle is traveling, or if a sensor detects that the brake pedal 32 is depressed when the vehicle is traveling. In this case, the controller 38 controls the driving circuits 142 and 144 (see FIG. 10) for the wheel driving motors 34 and 36 and the traveling motors 42 and 44 to charge the batteries 50 and 51 with the electric power generated by respective motors 34, 36, 42, and 44.

Further, in this case, simply configuring the traveling system clutch 92 as a two-way clutch is not sufficient to transmit the rotation of the caster wheels 18 and 20 to the traveling motors 42 and 44 when the vehicle is decelerating. Accordingly, the regenerative braking by the caster wheels 18 and 20 cannot be realized. Therefore, to realize the regenerative braking by the caster wheels 18 and 20, the controller 38 executes the following regenerative braking control processing. More specifically, in the regenerative braking control processing, the controller 38 controls the traveling motors 42 and 44 to rotate in a direction opposed to that in the normal traveling state. If it is determined that the regenerative braking request is present, the controller 38 supplies electric power to the traveling motors 42 and 44 to cause the traveling motors 42 and 44 to rotate in a direction opposed to that in the normal traveling state (i.e., motor acceleration direction in the traveling state). As a result, the traveling system clutch 92 is brought into the engaged state. Then, the controller 38 holds the engaged state of the traveling system clutch 92 so as to realize the regenerative braking by the traveling motors 42 and 44 that can regenerate electric power.

Further, as can be understood from FIG. 8, the steering system clutch 94 is a two-way clutch that enables power transmission between the steering motors 46 and 48 and the steering shaft 78 only when there is a tendency for the power to be transmitted from the steering motors 46 and 48 to the steering shaft 78. Further, the steering system clutch 94 disables the power transmission when there is a tendency for the power to be transmitted from the steering shaft 78 to the steering motors 46 and 48. Even in this case, the steering system clutch 94 can prevent the rotational force of the steering shaft 78 from being transmitted to the steering motors 46 and 48 in a state where the steering motors 46 and 48 are deactivated.

According to the above described configuration, the vehicle can prevent the steering motors 46 and 48 from acting as resistance for free steering in a state where the steering motors 46 and 48 are deactivated. Therefore, the vehicle can save energy. The caster wheels 18 and 20 are required to be directed in each of the right and left directions. Therefore, the steering motors 46 and 48 are required to rotate in both forward and reverse directions to flexibly change the direction of the power to be transmitted to the steering shaft 78. This is the reason why the steering system clutch 94 cannot be simply constituted by a one-way clutch.

In the present embodiment, the traveling system clutch 92 is constituted by a one-way clutch or a two-way clutch and the steering system clutch 94 is configured by a two-way clutch. Therefore, compared to the above described first embodiment, the present embodiment can simplify the control mechanism for the clutches 92 and 94 or can omit the mechanism. For example, the cable 116 connecting the clutches 92 and 94 to the controller 38 can be omitted.

Further, in the present embodiment, as understood from FIG. 10, the lawnmower vehicle 10 includes a hill-climbing detection sensor 178 that can detect whether the vehicle is in a hill-climbing state, namely whether the front end of the lawnmower vehicle 10 is positioned higher than the rear end thereof, or whether the hill-climbing angle of the vehicle is equal to or greater than a predetermined value. The ECU 140, which is provided in the controller 38, receives a detection signal from the hill-climbing detection sensor 178. If it is determined that the detection signal of the hill-climbing detection sensor 178 indicates that the vehicle is in the hill-climbing state, the ECU 140 controls the traveling motors 42 and 44 to set the speed $V_F$ of the left and right caster wheels 18 and 20 relative to the ground to be higher than the speed $V_R$ of the left and right wheels 14 and 15 relative to the ground (i.e., $V_F > V_R$). For example, in a case where the diameter of the caster wheels 18 and 20 is identical to the diameter of the wheels 14 and 15, the ECU 140 sets the rotational speed of the caster wheels 18 and 20 to be higher than the rotational speed of the wheels 14 and 15.

On the other hand, if it is determined that the detection signal of the hill-climbing detection sensor 178 indicates that the vehicle is not in the hill-climbing state, the ECU 140 controls the traveling motors 42 and 44 to set the speed $V_F$ of the left and right caster wheels 18 and 20 relative to the ground to be lower than the speed $V_R$ of the left and right wheels 14 and 15 relative to the ground (i.e., $V_F < V_R$). For example, the ECU 140 performs this control when the front end of the lawnmower vehicle 10 is positioned at the same height as the rear end of the lawnmower vehicle 10, namely, when the ground is substantially flat, or when the hill-climbing angle of the vehicle is less than the predetermined value. For example, in a case where the diameter of the caster wheels 18 and 20 is identical to the diameter of the wheels 14 and 15, the ECU 140 sets the rotational speed of the caster wheels 18 and 20 to be lower than the rotational speed of the wheels 14 and 15.

To realize the above described control, the controller 38 can use detection values of the rotational speeds of the wheel driving motors 34 and 36 that correspond to the speeds of the left and right wheels 14 and 15 relative to the ground and detection values of the rotational speeds of the traveling motors 42 and 44 that correspond to the speeds of the left and right caster wheels 18 and 20 relative to the ground. It is preferable that, if it is determined that the vehicle is in the hill-climbing state, the controller 38 controls the traveling motors 42 and 44 so as to set the speed $V_F$ of the left and right caster wheels 18 and 20 relative to the ground to be higher, by the amount equivalent to 20% or less, than the speed $V_R$ of the left and right wheels 14 and 15 relative to the ground.

More preferably, the controller 38 controls the traveling motors 42 and 44 so as to set the speed $V_F$ to be higher, by the amount equivalent to 15% or less, than the speed $V_R$. According to the above described configuration, in a case where the traveling system clutch 92 is a one-way clutch or a two-way clutch, these clutches can be used to realize four-wheel driving only when the driving power of the left and right wheels 14 and 15 is not sufficiently transmitted to the ground, if the vehicle is traveling on a flat ground. For example, the left and right wheels 14 and 15 may slip when the vehicle is traveling on a road having a low surface resistance, e.g., when the left and right wheels 14 and 15 are trapped in mud. On the other hand, these clutches can be used to realize two-wheel driving only when the driving power of the left and right wheels 14 and 15 is sufficiently transmitted to the ground.

Further, in a case where the traveling system clutch 92 is a one-way clutch or a two-way clutch, the vehicle can constantly maintain four-wheel drive traveling to prevent frequent switching between the two-wheel driving state and the four-wheel driving state that may occur when the vehicle is in a hill-climbing traveling state because the left and right wheels 14 and 15 tend to slip. Thus, the present embodiment can improve ride comfort of the vehicle and can realize stable traveling. The rest of the configuration is similar to that described in the above described first embodiment.

In the present embodiment, one of the traveling system clutch 92 and the steering system clutch 94 can be constituted by a one-way clutch or a two-way clutch (i.e., a non-electromagnetic clutch) and the other can be constituted by an electromagnetic clutch similar to that described in the first embodiment, which can be engaged or disengaged according to a control signal input from the controller 38.

Although not related to the present invention, in the above described embodiments, the traveling motors 42 and 44 dedicated to the caster wheels 18 and 20 for traveling and the traveling system clutch 92 can be omitted if desired to constantly realize the two-wheel driving by the left and right wheels 14 and 15.

What is claimed is:

1. A riding work vehicle, comprising:
   right and left wheels as main driving wheels that are respectively driven independently for traveling;
   at least one caster wheel as a steering control wheel whose operational state is selectable between free traveling and forced traveling and also between free steering and forced steering;
   a working machine that is operable for work on the ground;
   a traveling motor configured to drive the caster wheel for traveling;
   a steering motor configured to steer the caster wheel;
   a traveling system clutch that is provided in a traveling system power transmission path for transmitting the power from the traveling motor to an axle of the caster wheel and is configured to disable transmission of the rotational force from the axle to the traveling motor in a state where the traveling motor is deactivated; and
   a steering system clutch that is provided in a steering system power transmission path for transmitting the power between the steering motor and a steering shaft for the caster wheel and is configured to disable transmission of the rotational force from the steering shaft to the steering motor in a state where the steering motor is deactivated.

2. The riding work vehicle according to claim 1, wherein the traveling system clutch is configured to switch its operational state between an engaged state and a disengaged state according to a control signal input from a control unit;
   the steering system clutch is configured to switch its operational state between an engaged state and a disengaged state according to a control signal input from the control unit; and
   the control unit controls the engaged state and the disengaged state of the steering system clutch such that the steering system clutch is controlled to be in the disengaged state in an only case where the traveling system clutch is in the disengaged state.

3. The riding work vehicle according to claim 1, wherein the traveling system clutch is a one-way clutch.

4. The riding work vehicle according to claim 3, further comprising:
   a hill-climbing detection sensor configured to detect whether the vehicle is in a hill-climbing state, and
   a control unit that controls the traveling motor configured to drive the caster wheel for traveling such that if it is determined that the vehicle is in the hill-climbing state, the traveling speed of the caster wheel relative to the ground is controlled to be higher than the traveling speed of the right and left wheels relative to the ground.

5. A riding work vehicle, comprising:
   right and left wheels as main driving wheels that are respectively driven independently for traveling;
   at least one caster wheel as a steering control wheel whose operational state is selectable between free traveling and forced traveling and also between free steering and forced steering;
   a working machine that is operable for work on the ground;
   a traveling motor configured to drive the caster wheel for traveling;
   a steering motor configured to steer the caster wheel;
   a traveling system clutch that is provided in a traveling system power transmission path for transmitting the power from the traveling motor to an axle of the caster wheel and is configured to disable transmission of the rotational force from the axle to the traveling motor in a state where the traveling motor is deactivated;
   a steering system clutch that is provided in a steering system power transmission path for transmitting the power between the steering motor and a steering shaft for the caster wheel and is configured to disable transmission of the rotational force from the steering shaft to the steering motor in a state where the steering motor is deactivated; and
   a steering angle sensor that is provided on a downstream side of the steering system clutch in a power transmission direction of the steering system power transmission path and is configured to detect the steering angle of the steering shaft or a portion connected to the steering shaft.

6. The riding work vehicle according to claim 5, wherein the steering angle sensor includes
   a sensor shaft disposed in parallel with the steering shaft, and
   a gear mechanism provided between the sensor shaft and the steering shaft to transmit the rotation of the steering shaft to the sensor shaft at a rotational speed identical to that of the steering shaft or a rotational speed slower than that of the steering shaft.

7. A riding work vehicle, comprising:
   right and left wheels as main driving wheels that are respectively driven independently for traveling;
   at least one caster wheel as a steering control wheel whose operational state is selectable between free traveling and forced traveling and also between free steering and forced steering;
   a working machine that is operable for work on the ground;
   a traveling motor configured to drive the caster wheel for traveling;
   a steering motor configured to steer the caster wheel;
   a traveling system clutch that is provided in a traveling system power transmission path for transmitting the power from the traveling motor to an axle of the caster wheel and is configured to disable transmission of the rotational force from the axle to the traveling motor in a state where the traveling motor is deactivated; and
   a steering system clutch that is provided in a steering system power transmission path for transmitting the power between the steering motor and a steering shaft for the caster wheel and is configured to disable transmission of the rotational force from the steering shaft to the steering motor in a state where the steering motor is deactivated;
   wherein the traveling system clutch is configured to switch its operational state between an engaged state and a disengaged state according to a control signal input from the control unit,
   the steering system clutch is configured to switch its operational state between an engaged state and a disengaged state according to a control signal input from the control unit, and
   the control unit is configured to constantly engage the steering system clutch when the traveling system clutch is engaged.

8. A riding work vehicle, comprising:
   right and left wheels as main driving wheels that are respectively driven independently for traveling;
   at least one caster wheel as a steering control wheel whose operational state is selectable between free traveling and forced traveling and also between free steering and forced steering;
   a working machine that is operable for work on the ground;
   a traveling motor configured to drive the caster wheel for traveling;

a steering motor configured to steer the caster wheel;

a two-way traveling system clutch that is provided in a traveling system power transmission path for transmitting the power from the traveling motor to an axle of the caster wheel and is configured to disable transmission of the rotational force from the axle to the traveling motor in a state where the traveling motor is deactivated; and a steering system clutch that is provided in a steering system power transmission path for transmitting the power between the steering motor and a steering shaft for the caster wheel and is configured to disable transmission of the rotational force from the steering shaft to the steering motor in a state where the steering motor is deactivated;

a hill-climbing detection sensor configured to detect whether the vehicle is in a hill-climbing state, and a control unit that controls the traveling motor configured to drive the caster wheel for traveling such that if it is determined that the vehicle is in the hill-climbing state, the traveling speed of the caster wheel relative to the ground is controlled to be higher than the travelling speed of the right and left wheels relative to the ground.

* * * * *